(12) United States Patent
Gibson et al.

(10) Patent No.: US 7,120,075 B1
(45) Date of Patent: Oct. 10, 2006

(54) MULTI-FIFO INTEGRATED CIRCUIT DEVICES THAT SUPPORT MULTI-QUEUE OPERATING MODES WITH ENHANCED WRITE PATH AND READ PATH QUEUE SWITCHING

(75) Inventors: David Stuart Gibson, Suwanee, GA (US); Roland T. Knaack, Duluth, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 182 days.

(21) Appl. No.: 10/876,339

(22) Filed: Jun. 24, 2004

Related U.S. Application Data

(60) Provisional application No. 60/532,090, filed on Dec. 23, 2003, provisional application No. 60/495,907, filed on Aug. 18, 2003.

(51) Int. Cl.
*G11C 7/00* (2006.01)
(52) U.S. Cl. ............ 365/221; 365/189.01; 365/189.02; 365/230.05
(58) Field of Classification Search ................ 365/221, 365/189.01, 189.02, 230.05
See application file for complete search history.

(56) References Cited

U.S. PATENT DOCUMENTS

| | | | |
|---|---|---|---|
| 5,261,064 A | 11/1993 | Wyland | |
| 5,371,708 A | 12/1994 | Kobayashi | |
| 5,546,347 A | 8/1996 | Ko et al. | |
| 5,663,910 A | 9/1997 | Ko et al. | |
| 5,978,307 A | 11/1999 | Proebsting et al. | |
| 5,982,700 A | 11/1999 | Proebsting | |
| 5,999,478 A | 12/1999 | Proebsting | |
| 6,094,375 A | 7/2000 | Lee | |
| 6,115,760 A | 9/2000 | Lo et al. | |
| 6,118,835 A | 9/2000 | Barakat et al. | |
| 6,134,180 A | 10/2000 | Kim et al. | |
| 6,147,926 A | 11/2000 | Park | |
| 6,151,273 A | 11/2000 | Iwamoto et al. | |
| 6,154,418 A | 11/2000 | Li | |
| 6,154,419 A | 11/2000 | Shakkarwar | |
| 6,201,760 B1 | 3/2001 | Yun et al. | |

(Continued)

FOREIGN PATENT DOCUMENTS

EP  0 421 627 A2  9/1990

(Continued)

OTHER PUBLICATIONS

Invitation to Pay Additional Fees, Annex to Form PCT/ISA/206, Communication Relating to the Results of the Partial International Search, PCT/US02/26516, Oct. 13, 2003.

*Primary Examiner*—Richard Elms
*Assistant Examiner*—Pho M. Luu
(74) *Attorney, Agent, or Firm*—Myers Bigel Sibley & Sajovec

(57) ABSTRACT

An integrated circuit chip includes a plurality of independent FIFO memory devices that are each configured to support all four combinations of DDR and SDR write modes and DDR and SDR read modes and collectively configured to support all four multiplexer, demultiplexer, broadcast and multi-Q operating modes. The multi-Q mode of operation supports write path queue switching that is free of write word fall-through and read path queue switching that is free of read word fall-through. The multi-Q mode also supports write path queue switching on every write cycle in both SDR and DDR write modes and independent read path queue switching on every read cycle in both SDR and DDR read modes.

16 Claims, 22 Drawing Sheets

U.S. PATENT DOCUMENTS

| | | |
|---|---|---|
| 6,233,199 B1 | 5/2001 | Ryan |
| 6,240,031 B1 | 5/2001 | Mehrotra et al. |
| 6,240,042 B1 | 5/2001 | Li |
| 6,252,441 B1 | 6/2001 | Lee et al. |
| 6,259,652 B1 | 7/2001 | Heyne et al. |
| 6,263,410 B1 | 7/2001 | Kao et al. |
| 6,269,413 B1 | 7/2001 | Sherlock |
| 6,272,065 B1 | 8/2001 | Kim |
| 6,279,073 B1 | 8/2001 | McCracken et al. |
| 6,282,128 B1 | 8/2001 | Lee |
| 6,327,216 B1 | 12/2001 | Ryan |
| 6,330,636 B1 | 12/2001 | Bondurant et al. |
| 6,337,809 B1 | 1/2002 | Kim et al. |
| 6,337,830 B1 | 1/2002 | Faue |
| 6,338,103 B1 | 1/2002 | Kirihata |
| 6,339,558 B1 | 1/2002 | Ioki |
| 6,356,506 B1 | 3/2002 | Ryan |
| 6,377,071 B1 | 4/2002 | Wang et al. |
| 6,381,194 B1 | 4/2002 | Li |
| 6,381,661 B1 | 4/2002 | Messerly et al. |
| 6,381,684 B1 | 4/2002 | Hronik et al. |
| 6,400,642 B1 | 6/2002 | Mehrotra et al. |
| 6,411,561 B1 | 6/2002 | Ayukawa et al. |
| 6,438,066 B1 | 8/2002 | Ooishi et al. |
| 6,477,110 B1 | 11/2002 | Yoo et al. |
| 6,522,599 B1 | 2/2003 | Ooishi et al. |
| 6,546,461 B1 | 4/2003 | Au et al. |
| 6,640,267 B1 * | 10/2003 | Raza .................. 710/38 |
| 6,671,787 B1 | 12/2003 | Kanda et al. |
| 6,778,454 B1 | 8/2004 | Duh et al. |
| 6,795,360 B1 * | 9/2004 | Duh et al. .......... 365/221 |
| 6,907,479 B1 * | 6/2005 | Karnstedt et al. ........ 710/52 |
| 2001/0004335 A1 | 6/2001 | Murakami |
| 2001/0014053 A1 | 8/2001 | Li |
| 2001/0029558 A1 | 10/2001 | Kobara et al. |
| 2001/0054121 A1 | 12/2001 | Proch et al. |
| 2002/0048201 A1 | 4/2002 | Garg |
| 2001/0071332 | 6/2002 | Nishiyama et al. |
| 2002/0089927 A1 | 7/2002 | Fischer et al. |
| 2005/0018514 A1 * | 1/2005 | Knaack et al. ......... 365/221 |

FOREIGN PATENT DOCUMENTS

| | | |
|---|---|---|
| EP | 0 978 842 A1 | 2/2000 |
| JP | 08202618 | 8/1996 |

* cited by examiner

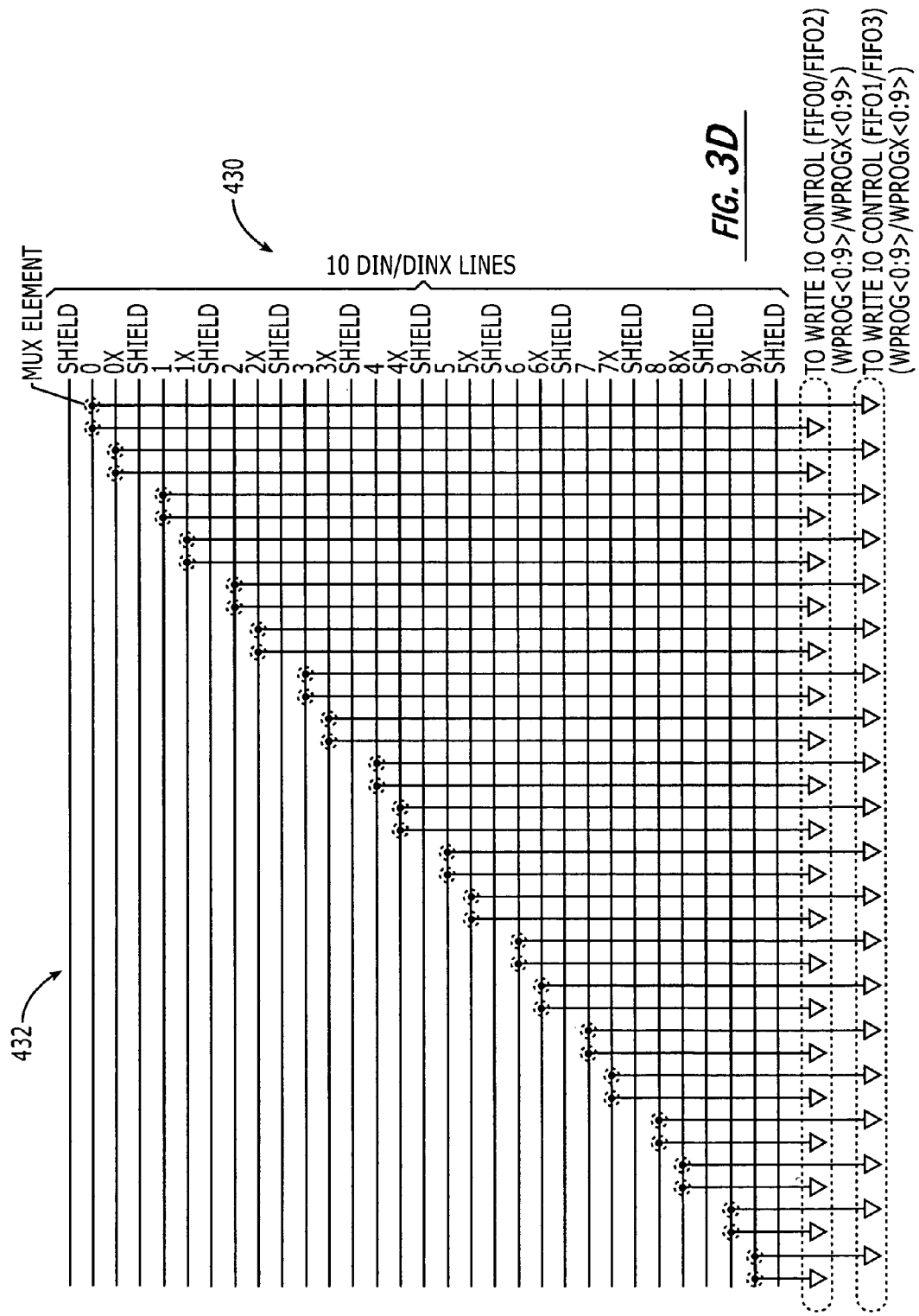

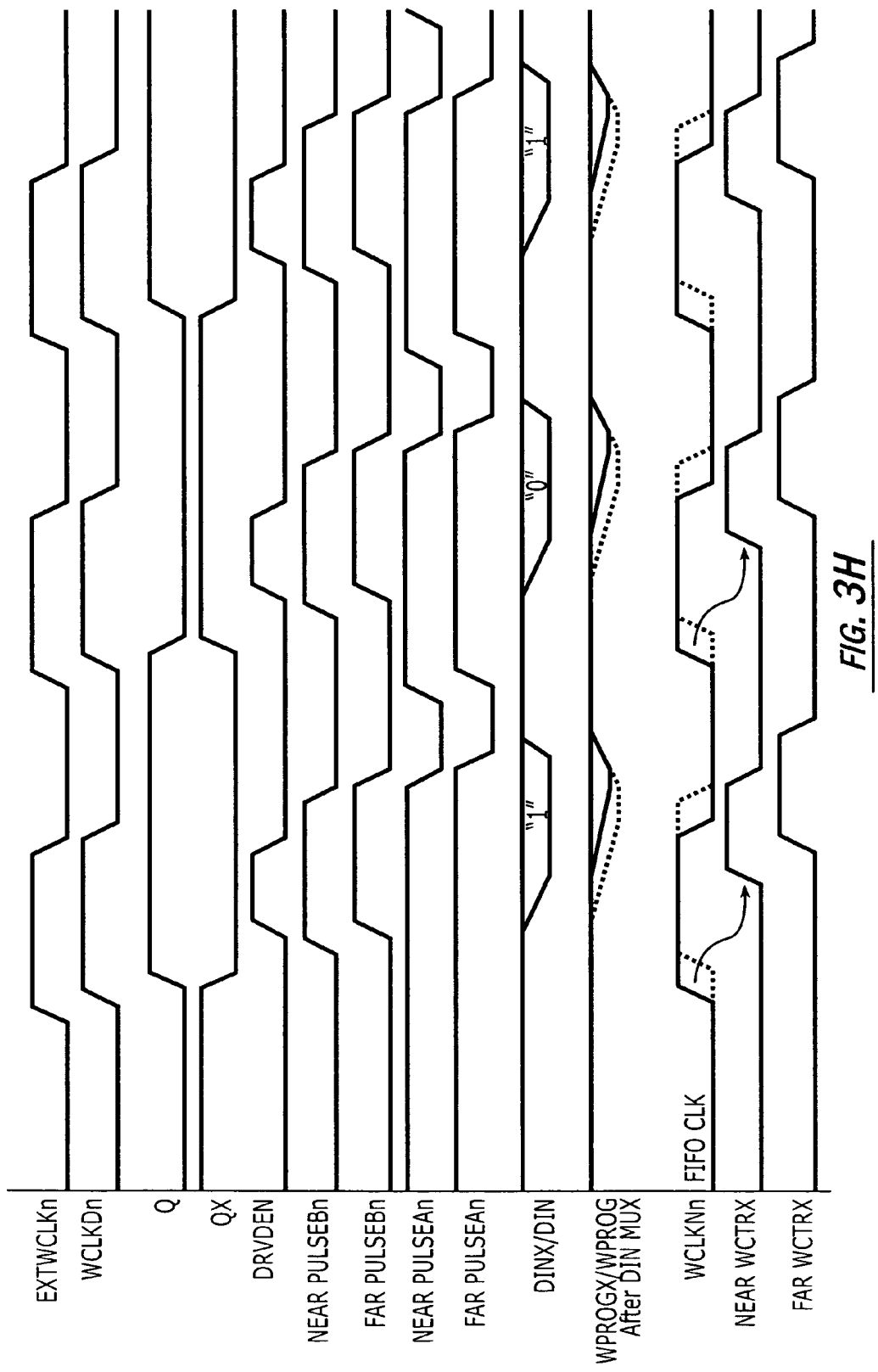

MULTI-FIFO INTEGRATED CIRCUIT DEVICES THAT SUPPORT MULTI-QUEUE OPERATING MODES WITH ENHANCED WRITE PATH AND READ PATH QUEUE SWITCHING

REFERENCE TO PRIORITY APPLICATION

This application derives priority from U.S. Provisional Application Ser. No. 60/532,090, filed Dec. 23, 2003 and U.S. Provisional Application Ser. No. 60/495,907, filed Aug. 18, 2003, the disclosures of which are hereby incorporated herein by reference.

FIELD OF THE INVENTION

The present invention relates to integrated circuit memory devices and, more particularly, to first-in first-out (FIFO) memory devices.

BACKGROUND OF THE INVENTION

Semiconductor memory devices can typically be classified on the basis of memory functionality, data access patterns and the nature of the data storage mechanism. For example, distinctions are typically made between read-only memory (ROM) devices and read-write memory (RWM) devices. The RWM devices typically have the advantage of offering both read and write functionality with comparable data access times. Typically, in RWM devices, data can be stored in flip-flops for "static" memory devices or as preset levels of charge on a capacitor in "dynamic" memory devices. As will be understood by those skilled in the art, static memory devices retain their data as long as a supply of power is maintained, however, dynamic memory devices require periodic data refreshing to compensate for potential charge leakage. Because RWM devices use active circuitry to store data, they belong to a class of memory devices known as "volatile" memory devices because data stored therein will be lost upon termination of the power supply. ROM devices, on the other hand, may encode data into circuit topology (e.g., by blowing fuses, removing diodes, etc.). Because this latter type of data storage may be hard-wired, the data cannot be modified, but can only be read. ROM devices also typically belong to a class of memory devices known as "nonvolatile" memory devices because data stored therein will typically not be lost upon termination of the power supply. Other types of memory devices include nonvolatile read-write (NVRWM) memory devices. These types of nonvolatile memory devices may operate as erasable programmable read-only memory (EPROM) devices, electrically erasable programmable read-only memory ($E^2$PROM) devices and flash memory devices, for example.

An additional memory classification is typically based on the order in which data can be accessed. Here, most memory devices belong to the random-access class, which means that memory locations can be read from or written to in random order. Notwithstanding the fact that most memory devices provide random-access, typically only random-access RWM memories use the acronym RAM. Alternatively, memory devices may restrict the order of data access to achieve shorter data access times, reduce layout area and/or provide specialized functionality. Examples of such specialized memory devices include buffer memory devices such as first-in first-out (FIFO) memory devices, last-in first-out (LIFO or "stack") memory devices, shift registers and content-addressable memory (CAM) devices.

A final classification of semiconductor memories is based on the number of data input and data output ports associated with the memory cells therein. For example, although most memory devices have unit cells therein that provide only a single port, which is shared to provide an input and output path for transfer of data, memory devices with higher bandwidth requirements often have cells therein with multiple input and output ports. However, the addition of ports to unit memory cells typically increases the complexity and layout area requirements for these higher bandwidth memory devices.

Single-port memory devices are typically made using static RAM cells if fast data access times are a requirement, and dynamic RAM cells if low cost is a primary requirement. Many FIFO memory devices use dual-port RAM based designs with self-incrementing internal read and write pointers to achieve fast fall-through capability. As will be understood by those skilled in the art, fall-through capability is typically measured as the time elapsing between the end of a write cycle into a previously empty FIFO and the time an operation to read that data may begin. Exemplary FIFO memory devices are more fully described and illustrated at section 2.2.7 of a textbook by A. K. Sharma entitled "Semiconductor Memories: Technology, Testing and Reliability", IEEE Press (1997).

In particular, dual-port SRAM-based FIFOs typically utilize separate read and write pointers to advantageously allow read and write operations to occur independently of each other and achieve fast fall-through capability as data written into a dual-port SRAM FIFO can be immediately accessed for reading. Since these read and write operations may occur independently, independent read and write clocks having different frequencies may be provided to enable the FIFO to act as a buffer between peripheral devices operating at different rates. Unfortunately, a major disadvantage of typical dual-port SRAM-based FIFOs is the relatively large unit cell size for each dual-port SRAM cell therein. Thus, for a given semiconductor chip size, dual-port buffer memory devices typically provide less memory capacity relative to single-port buffer memory devices. For example, using a standard DRAM cell as a reference unit cell consuming one (1) unit of area, a single-port SRAM unit cell typically may consume four (4) units of area and a dual-port SRAM unit cell typically may consume sixteen (16) units of area. Moreover, the relatively large unit cells of a dual-port SRAM FIFO limit the degree to which the number of write operations can exceed the number of read operations before the FIFO becomes full.

To address these limitations of dual-port buffer memory devices, single-port buffer memory devices have been developed to, among other things, achieve higher data capacities for a given semiconductor chip size. For example, U.S. Pat. No. 5,546,347 to Ko et al. entitled "Interleaving Architecture And Method For A High Density FIFO", assigned to the present assignee, discloses a memory device that has high capacity and uses relatively small single-port memory cells. However, the use of only single port memory cells typically precludes simultaneous read and write access to data in the same memory cell, which means that single-port buffer memory devices typically have slower fall-through time than comparable dual-port memory devices. Moreover, single-port buffer memory devices may use complicated arbitration hardware to control sequencing and queuing of reading and writing operations.

U.S. Pat. No. 5,371,708 to Kobayashi also discloses a FIFO memory device containing a single-port memory array, a read data register for holding read data from the memory array and a write data register for holding data to be written into the memory array. A bypass switch is also provided for transferring data from the write data register to the read data register so that the memory array can be bypassed during testing of the FIFO to detect the presence of defects therein. However, like the above-described single-port buffer memory devices, simultaneous read and write access to data is not feasible.

Commonly assigned U.S. Pat. Nos. 5,978,307, 5,982,700 and 5,998,478 disclose FIFO memory devices having generally fast fall-through capability. These memory buffers contain a tri-port memory array of moderate capacity having nonlinear columns of tri-port cells therein, which collectively form four separate registers, and a substantially larger capacity supplemental memory array (e.g., DRAM array) having cells therein with reduced unit cell size. The tri-port memory array has a read port, a write port and a bidirectional input/output port. The tri-port memory array communicates internally with the supplemental memory array via the bidirectional input/output port and communicates with external devices (e.g., peripheral devices) via the read and write data ports. Efficient steering circuitry is also provided by a bidirectional crosspoint switch that electrically couples terminals (lines IO and IOB) of the bidirectional input/output port in parallel to bit lines (BL and BLB) in the supplemental memory array during a write-to-memory time interval and vice versa during a read-from-memory time interval.

U.S. Pat. Nos. 6,240,031, 6,377,071 and 6,400,642, which are related and commonly assigned to Cypress Semiconductor Corp., disclose a pair of FIFOs that are configured to operate internally in a ping-pong fashion during read and write cycles. Each FIFO in the pair operates at half the frequency of an external clock in order to provide DDR read functions and DDR write functions. U.S. Pat. No. 6,134,180 to Kim et al. discloses a synchronous random access memory (RAM) device that supports burst write operations and burst read operations at single and dual data rates. However, unlike a FIFO memory device, the RAM device disclosed in the '180 patent does not support write and read operations to and from a memory core during overlapping time intervals. FIFO memory devices that support all four combinations of dual data rate (DDR) and single data rate (SDR) write and read operations are disclosed in commonly assigned published U.S. Patent Application No. 2003/0112685.

Notwithstanding the above described memory devices, there still exists a need to develop FIFO memory devices having expanded functionality and increased data capacity. There also exists a need for FIFO memory devices that provide faster data transfer for such applications as network, video, telecommunications and data communications.

SUMMARY OF THE INVENTION

Integrated circuit devices according to embodiments of the present invention include an integrated circuit substrate (e.g., chip) having a plurality of independently operable FIFO memory devices therein. Each of these plurality of FIFO memory devices are configured to support all four combinations of DDR and SDR write modes and DDR and SDR read modes. These four combinations include: DDR write with DDR read, DDR write with SDR read, SDR write with DDR read and SDR write with SDR read. These FIFO memory devices are also configured to support all four of the following multi-FIFO operating modes: multiplexer, demultiplexer, broadcast and multi-queue. Each of the FIFO memory devices includes a plurality of arrays of memory elements therein that are accessed one-at-a-time when the respective FIFO memory device is being written to. The plurality of arrays may include four memory arrays that are arranged in quadrants and written to one-at-a-time and read from one-at-a-time. Lookahead word line precharging operations may also be performed to eliminate word line driving operations from the speed path during write and read cycles.

The plurality of FIFO memory devices may be collectively configured to support a multi-queue mode of operation that provides independent write path and read path queue switching. The write path queue switching is free of write word fall-through and the read path queue switching is free of read word fall-through. This enables the write path to be queue switched on every write cycle in both SDR and DDR write modes and the read path to be queue switched on every read cycle in both SDR and DDR read modes. The multi-queue mode of operation can also support write queue pointer changes that are free of corresponding write operations.

BRIEF DESCRIPTION OF THE DRAWINGS

FIG. 3D is a detailed illustration of a portion of a data input mux illustrated by FIG. 3B.

FIG. 3H is a timing diagram that illustrates operation of a portion of the write data path illustrated by FIG. 2A and FIGS. 3A–3G.

DESCRIPTION OF PREFERRED EMBODIMENTS

Figure 1A:
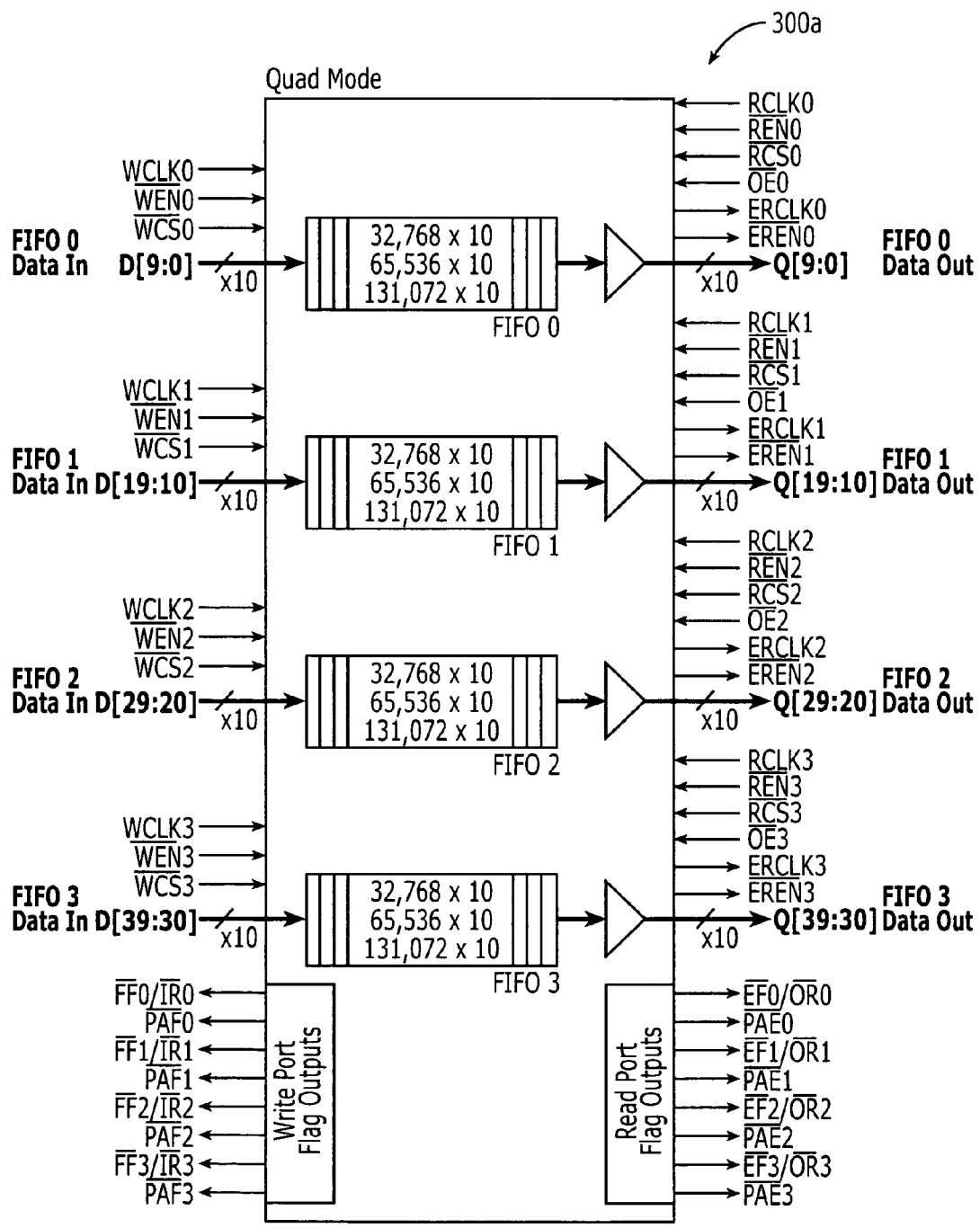
FIGS. 1A–1F are block diagrams that illustrate how multiple independent FIFOs within a multi-FIFO memory device can be configured to support quad, dual, mux, demux, broadcast and multi-queue modes of operation, according to embodiments of the present invention.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be through and complete, and will fully convey the scope of the invention to those skilled in the art. Like reference numerals refer to like elements throughout and signal lines and signals thereon may be referred to by the same reference characters. Signals may also be synchronized and/or undergo minor boolean operations (e.g., inversion) without being considered different signals. The suffix X (or prefix symbol "/") to a signal name may also denote a complementary data or information signal or an active low control signal, for example. Active low signals may be changed to active high signals and the description of such signals as active low signals should not be construed as limiting the embodiments described herein to the use of only such signals.

FIGS. 1A–1F illustrate embodiments of the present invention that utilize multiple independently operable FIFO memory devices on a monolithic substrate (e.g., integrated circuit chip) to provide various modes of operation. In particular, FIG. 1A illustrates an integrated DDR/SDR flow control device 300a having a plurality of FIFO memory devices therein that are integrated together on an integrated circuit substrate. These plurality of FIFO memory devices, which are shown as FIFO 0–FIFO 3 in the illustrated embodiment, are collectively configured to support a quad FIFO mode of operation at various capacities, with each FIFO configured to operate independently of the other FIFOs. The integrated circuit substrate is illustrated as including 40 input pins D[39:0] and 40 output pins Q[39:0], which are segmented into four groups of ten pins. Each FIFO is illustrated as being responsive to a corresponding write clock signal, shown as WCLKn, where n=0, 1, 2 or 3. These write clock signals WCLKn may be asynchronously timed relative to each other. Each FIFO is also illustrated as being responsive to a corresponding read clock signal, shown as RCLKn, and these read clock signals RCLKn may also be asynchronously timed relative to each other and relative to the write clock signals WCLKn.

The active low control signals /WENn and /WCSn on the write side of the substrate represent the write enable signals and write chip select signals, respectively. The active low control signals /RENn, /RCSn and /OEn on the read side of the substrate represent the read enable signals, read chip select signals and output enable signals, respectively. The read side of the substrate is also responsive to a plurality of echo read clocks /ECLKn and echo read enable signals /ERENn.

The flow control device 300a is illustrated as generating a plurality of flag and other control signals that can support depth cascading of multiple devices. On the write side of the device 300a, these flag related control signals include the full flag signals /FFn, programmable almost-full flag signals /PAFn and input ready signals /IRn. On the read side of the device 300a, these flag related control signals include the empty flag signals /EFn, programmable almost-empty flag signals /PAEn and output ready signals /ORn. These control signals represent conventional FIFO control signals, which are more fully described in commonly assigned U.S. patent application Ser. No. 09/972,265, filed Oct. 5, 2001, the disclosure of which is hereby incorporated herein by reference. Moreover, the use of these control signals to support depth cascading is more fully described in commonly assigned U.S. application Ser. No. 10/721,974, filed Nov. 24, 2003, the disclosure of which is hereby incorporated herein by reference.

The quad mode may be achieved in the flow control device 300a by setting a mode pin (MD1) high (e.g., to a logic 1 level) on an integrated circuit package or chip carrier (not shown) containing the monolithic substrate. When disposed in the quad mode, the "input width" pins (IW[1:0]) and "output width" pins (OW[1:0]) of the packaged device are set to achieve x10 write and x10 read data widths at the external data ports (D[9:0], D[19:10], D[29:20], D[39:30] and Q[9:0], Q[19:10], Q[29:20], Q[39:30]), as shown in TABLE 1. The settings on the write DDR pins (WDDR) and read DDR pins (RDDR) of the packaged device control whether the internal bus widths are x10 or x20 for a given FIFO. Accordingly, by setting the pins WDDR and RDDR high for a respective FIFO, an internal bus word width of x20 is achieved for both write and read operations. This means that two external x10 write words will be clocked into the device 300a on consecutive rising and falling edges of a respective write clock signal WCLKn and processed internally as one x20 write word. This dual data rate mode translates to a x80 internal write bus operation when all FIFOs are disposed in a WDDR mode. (See, e.g., TABLE 9). Similarly, when a FIFO is disposed in a RDDR mode, one internal x20 read word from the FIFO will be clocked out of the device 300a on consecutive rising and falling edges of a respective read clock signal RCLKn as two x10 read words.

TABLE 1

| QUAD MODE PIN SETTINGS | | | | | | External Word Width | | Internal Word Width | |
|---|---|---|---|---|---|---|---|---|---|
| WDDR | IW1 | IW0 | RDDR | OW1 | OW0 | IN | OUT | IN | OUT |
| L | L | L | L | L | L | 10 | 10 | 10 | 10 |
| H | L | L | L | L | L | 10 | 10 | 20 | 10 |
| L | L | L | H | L | L | 10 | 10 | 10 | 20 |
| H | L | L | H | L | L | 10 | 10 | 20 | 20 |

Figure 1B:
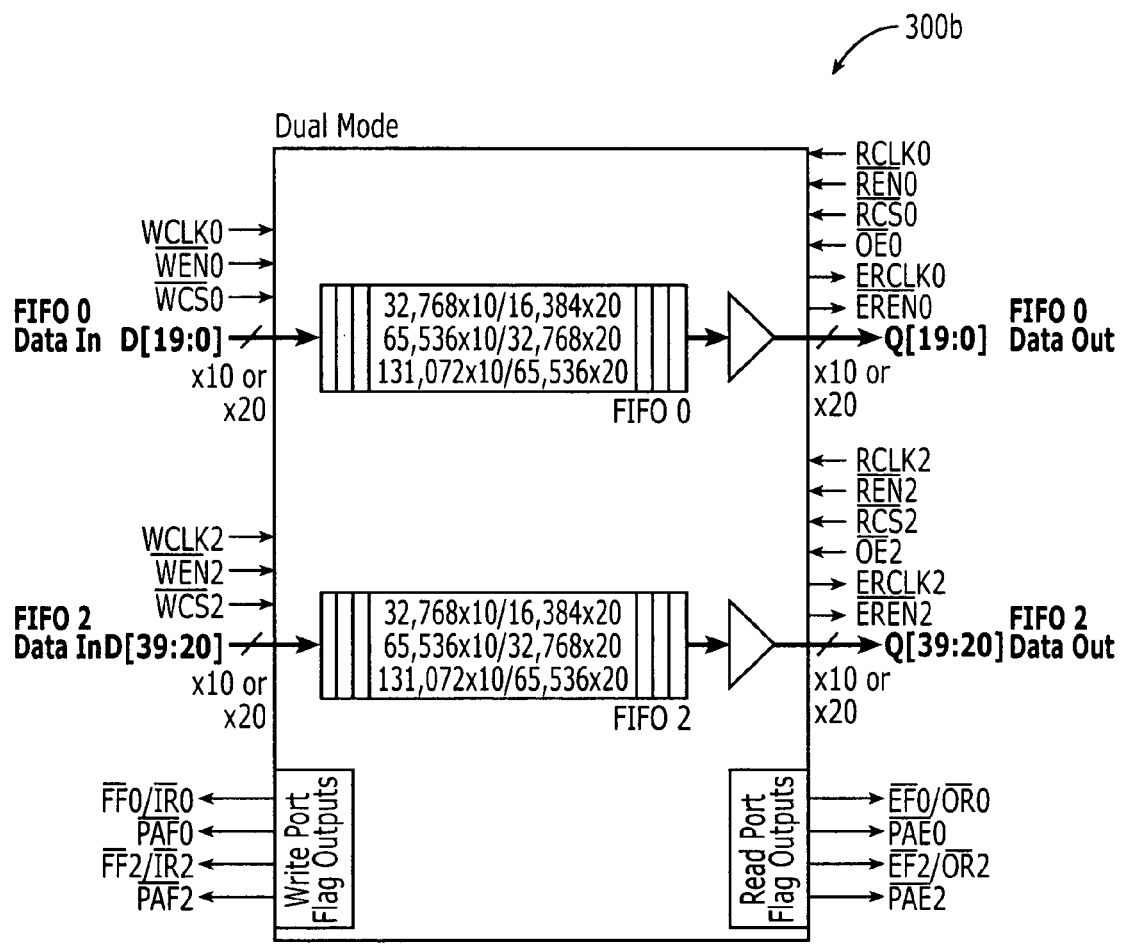

In FIG. 1B, an integrated DDR/SDR flow control device 300b is illustrated that supports a dual FIFO mode of operation, with FIFOs 0 and 2 being active and FIFOs 1 and 3 being disabled. In the device 300b, the mode pin (MD1) may be held low to set the dual-FIFO mode of operation and the input width pin IW0 and output width pin OW0 may be set high to reflect x20 external bus operation at the write and read ports, respectively. This x20 external bus operation translates into x40 internal bus operation in the write path when the write DDR pin (WDDR) is set high and x40 internal bus operation in the read path when the read DDR pin (RDDR) is set high. The available configurations of the external and internal word widths are illustrated more fully by TABLE 2.

TABLE 2

| DUAL MODE PIN SETTINGS | | | | | | External Word Width | | Internal Word Width | |
|---|---|---|---|---|---|---|---|---|---|
| WDDR | IW1 | IW0 | RDDR | OW1 | OW0 | IN | OUT | IN | OUT |
| L | L | L | L | L | L | 10 | 10 | 10 | 10 |
| L | L | L | L | L | H | 10 | 20 | 10 | 20 |
| L | L | H | L | L | L | 20 | 10 | 20 | 10 |
| L | L | H | L | L | H | 20 | 20 | 20 | 20 |
| H | L | L | L | L | L | 10 | 10 | 20 | 10 |
| H | L | L | L | L | H | 10 | 20 | 20 | 20 |
| H | L | H | L | L | L | 20 | 10 | 40 | 10 |
| H | L | H | L | L | H | 20 | 20 | 40 | 20 |
| L | L | L | H | L | L | 10 | 10 | 10 | 20 |
| L | L | L | H | L | H | 10 | 20 | 10 | 40 |
| L | L | H | H | L | L | 20 | 10 | 20 | 20 |
| L | L | H | H | L | H | 20 | 20 | 20 | 40 |
| H | L | L | H | L | L | 10 | 10 | 20 | 20 |
| H | L | L | H | L | H | 10 | 20 | 20 | 40 |
| H | L | H | H | L | L | 20 | 10 | 40 | 20 |
| H | L | H | H | L | H | 20 | 20 | 40 | 40 |

Figure 1C:
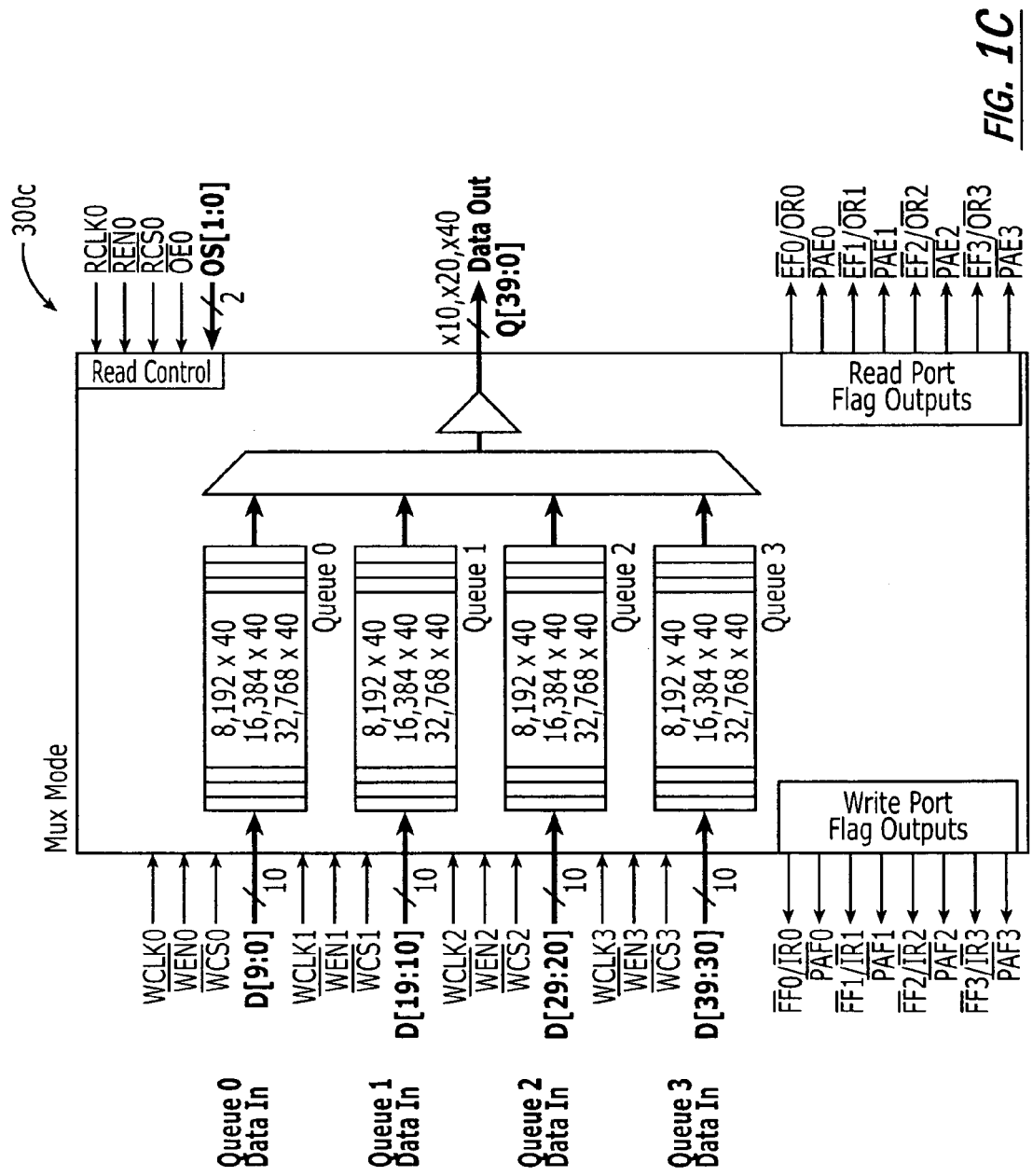

In FIG. 1C, an integrated DDR/SDR flow control device 300c is illustrated that supports a MUX mode of operation, with each independent FIFO representing a respective queue. The device 300c has four independent write ports and one common read port Q[39:0] that may be configured to support x10, x20 and x40 word widths. The output select signal OS[1:0] identifies which one of the four FIFOs is to be read from during a respective read cycle. The MUX mode of operation may be achieved by setting mode pin MD1 high and mode pin MD0 low on a package containing a substrate that is configured to support MUX, DEMUX and MULTI-Q modes. As illustrated by TABLE 3, the maximum internal write word width is x20 when the DDR write mode is selected. The maximum internal read word width is x80 when the DDR read mode is selected, the read port is set to x40 and the output width pins OW1 and OW0 are set high and low, respectively, to reflect the x40 read port setting.

TABLE 3

| MUX MODE PIN SETTINGS | | | | | | External Word Width | | Internal Word Width | |
|---|---|---|---|---|---|---|---|---|---|
| WDDR | IW1 | IW0 | RDDR | OW1 | OW0 | IN | OUT | IN | OUT |
| L | L | L | L | L | L | 10 | 10 | 10 | 10 |
| L | L | L | L | L | H | 10 | 20 | 10 | 20 |
| L | L | L | L | H | L | 10 | 40 | 10 | 40 |
| H | L | L | L | L | L | 10 | 10 | 20 | 10 |
| H | L | L | L | L | H | 10 | 20 | 20 | 20 |
| H | L | L | L | H | L | 10 | 40 | 20 | 40 |
| L | L | L | H | L | L | 10 | 10 | 10 | 20 |
| L | L | L | H | L | H | 10 | 20 | 10 | 40 |
| L | L | L | H | H | L | 10 | 40 | 10 | 80 |
| H | L | L | H | L | L | 10 | 10 | 20 | 20 |
| H | L | L | H | L | H | 10 | 20 | 20 | 40 |
| H | L | L | H | H | L | 10 | 40 | 20 | 80 |

Figure 1D:
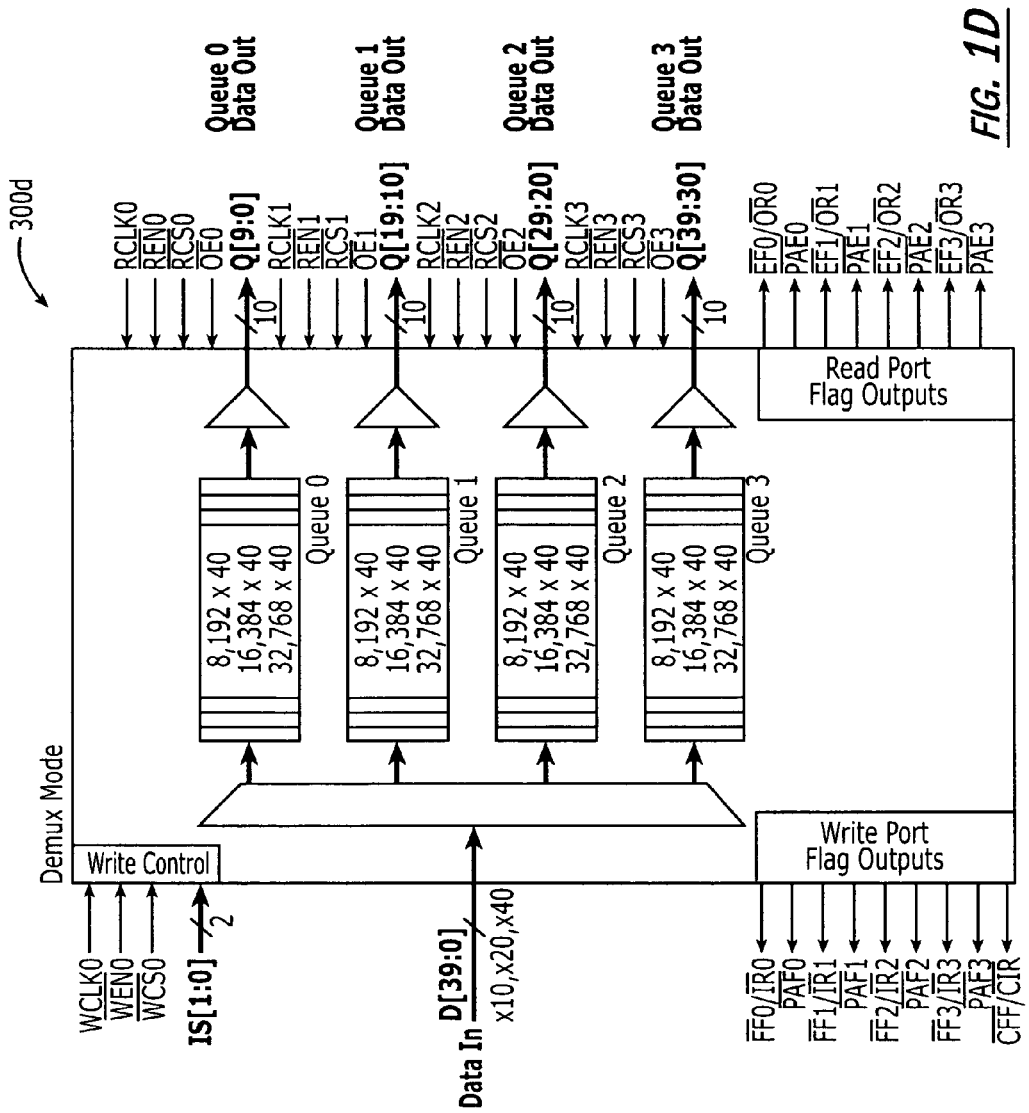

In FIG. 1D, an integrated DDR/SDR flow control device 300d is illustrated that supports a DEMUX mode of operation, with each independent FIFO representing a respective queue. The device 300d has four independent read ports and one common write port D[39:0] that may be configured to support x10, x20 and x40 word widths. The input select signal IS[1:0] identifies which one of the four FIFOs is to be written to during a respective write cycle. The DEMUX mode of operation may be achieved by setting mode pin MD1 low and mode pin MD0 low. As illustrated by TABLE 4, the maximum internal write word width is x80 when the DDR write mode is selected, the write port is set to x40 and the input pins IW1 and IW0 are set high and low, respectively. The maximum internal read word width is x20 when the DDR read mode is selected.

TABLE 4

| DEMUX MODE PIN SETTINGS | | | | | | External Word Width | | Internal Word Width | |
|---|---|---|---|---|---|---|---|---|---|
| WDDR | IW1 | IW0 | RDDR | OW1 | OW0 | IN | OUT | IN | OUT |
| L | L | L | L | L | L | 10 | 10 | 10 | 10 |
| L | L | H | L | L | L | 20 | 10 | 20 | 10 |
| L | H | L | L | L | L | 40 | 10 | 40 | 10 |
| H | L | L | L | L | L | 10 | 10 | 20 | 10 |
| H | L | H | L | L | L | 20 | 10 | 40 | 10 |
| H | H | L | L | L | L | 40 | 10 | 80 | 10 |
| L | L | L | H | L | L | 10 | 10 | 10 | 20 |
| L | L | H | H | L | L | 20 | 10 | 20 | 20 |
| L | H | L | H | L | L | 40 | 10 | 40 | 20 |
| H | L | L | H | L | L | 10 | 10 | 20 | 20 |
| H | L | H | H | L | L | 20 | 10 | 40 | 20 |
| H | H | L | H | L | L | 40 | 10 | 80 | 20 |

Figure 1E:
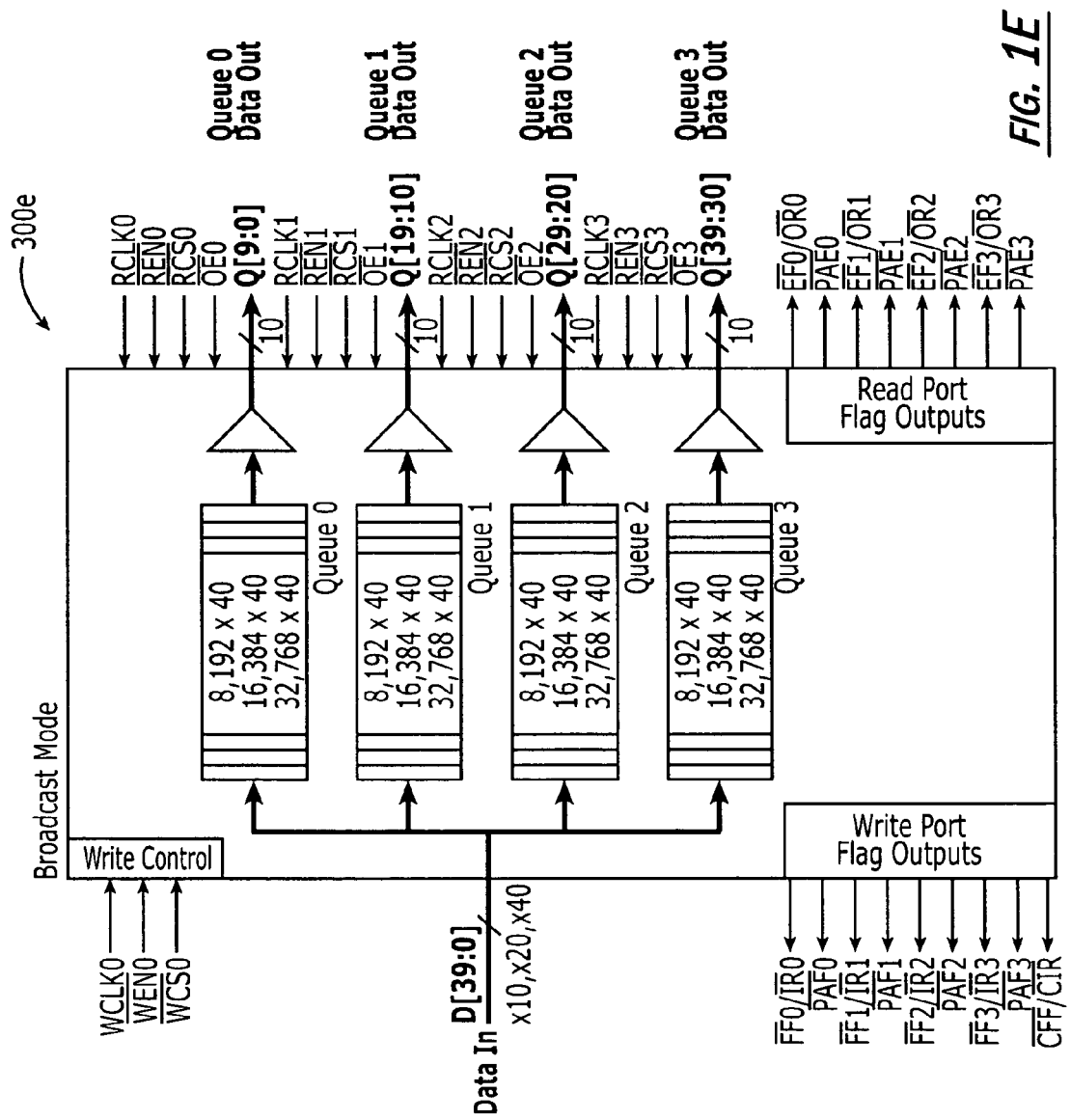

In FIG. 1E, an integrated DDR/SDR flow control device 300e is illustrated that supports a BROADCAST mode of operation, with each independent FIFO representing a respective queue. The device 300e has four independent read ports and one common write port D[39:0] that may be configured to support x10, x20 and x40 word widths. This mode of operation may be achieved by setting mode pin MD1 low and mode pin MD0 high. As illustrated by TABLE 5, the maximum internal write word width is x80 when the DDR write mode is selected, the write port is set to x40 and the input pins IW1 and IW0 are set high and low, respectively. The maximum internal read word width is x20 when the DDR read mode is selected. In order to guarantee data consistency when the broadcast mode is selected, write operations can only be performed if all queues have available space. Composite flags may be generated for this purpose to signify when at least one of the four FIFOs has become full.

TABLE 5

| BROADCAST MODE PIN SETTINGS | | | | | | External Word Width | | Internal Word Width | |
|---|---|---|---|---|---|---|---|---|---|
| WDDR | IW1 | IW0 | RDDR | OW1 | OW0 | IN | OUT | IN | OUT |
| L | L | L | L | L | L | 10 | 10 | 10 | 10 |
| L | L | H | L | L | L | 20 | 10 | 20 | 10 |
| L | H | L | L | L | L | 40 | 10 | 40 | 10 |
| H | L | L | L | L | L | 10 | 10 | 20 | 10 |
| H | L | H | L | L | L | 20 | 10 | 40 | 10 |
| H | H | L | L | L | L | 40 | 10 | 80 | 10 |
| L | L | L | H | L | L | 10 | 10 | 10 | 20 |
| L | L | H | H | L | L | 20 | 10 | 20 | 20 |
| L | H | L | H | L | L | 40 | 10 | 40 | 20 |
| H | L | L | H | L | L | 10 | 10 | 20 | 20 |
| H | L | H | H | L | L | 20 | 10 | 40 | 20 |
| H | H | L | H | L | L | 40 | 10 | 80 | 20 |

Figure 1F:
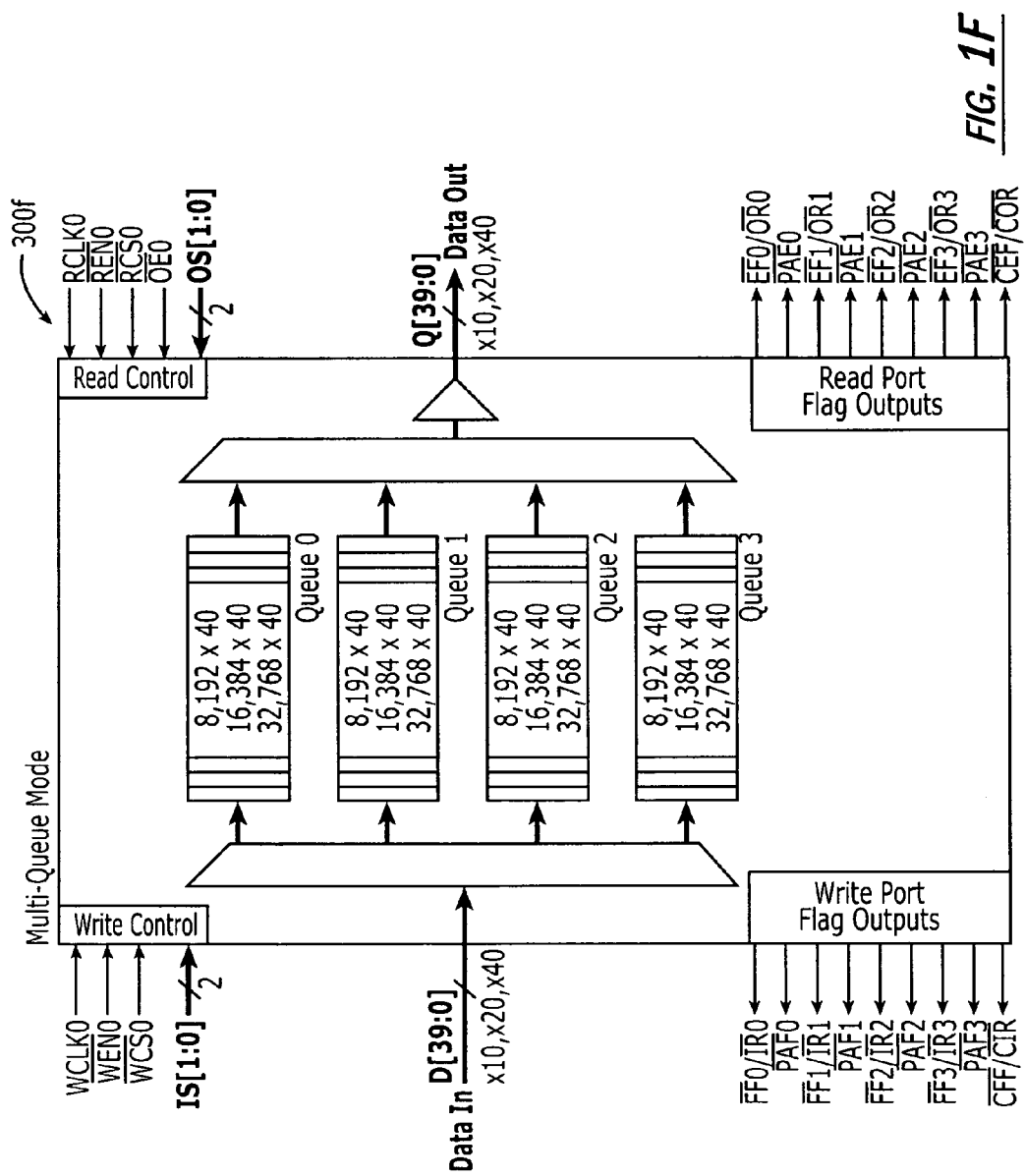

In FIG. 1F, an integrated DDR/SDR flow control device 300f is illustrated that supports a multi-Q mode of operation, with each independent FIFO representing a respective queue. The device 300f has one common read port Q[39:0] and one common write port D[39:0] that may be configured to support x10, x20 and x40 word widths. The write and read paths are independent and support independent write path and read path queue switching. The user selectable write queue is independent of the user selectable read queue, which means the input select signal IS[1:0] and output select signal OS[1:0] can be set independently. As illustrated by TABLE 6, the maximum internal write word width is x80 when the DDR write mode is selected, the write port is set to x40 and the input pins IW1 and IW0 are set high and low, respectively. Similarly, the maximum internal read word width is x80 when the DDR read mode is selected, the read port is set to x40 and the output pins OW1 and OW0 are set high and low, respectively.

As described more fully hereinbelow, this multi-Q mode of operation supports write path queue switching that is free of write word fall-through and read path queue switching that is free of read word fall-through. The multi-Q mode of operation also supports write path queue switching on every write cycle in both SDR and DDR write modes and independent read path queue switching on every read cycle in both SDR and DDR read modes. Moreover, the multi-queue mode of operation supports write queue pointer changes that are free of corresponding write operations (i.e., the write queue pointer can be changed in the absence of a write operation).

TABLE 6

| MULTI-Q MODE PIN SETTING | | | | | | External Word Width | | Internal Word Width | |
|---|---|---|---|---|---|---|---|---|---|
| WDDR | IW1 | IW0 | RDDR | OW1 | OW0 | IN | OUT | IN | OUT |
| L | L | L | L | L | L | 10 | 10 | 10 | 10 |
| L | L | L | L | L | H | 10 | 20 | 10 | 20 |
| L | L | L | L | H | L | 10 | 40 | 10 | 40 |
| L | L | H | L | L | L | 20 | 10 | 20 | 10 |
| L | L | H | L | L | H | 20 | 20 | 20 | 20 |
| L | L | H | L | H | L | 20 | 40 | 20 | 40 |
| L | H | L | L | L | L | 40 | 10 | 40 | 10 |
| L | H | L | L | L | H | 40 | 20 | 40 | 20 |
| L | H | L | L | H | L | 40 | 40 | 40 | 40 |
| H | L | L | L | L | L | 10 | 10 | 20 | 10 |
| H | L | L | L | L | H | 10 | 20 | 20 | 20 |
| H | L | L | L | H | L | 10 | 40 | 20 | 40 |
| H | L | H | L | L | L | 20 | 10 | 40 | 10 |
| H | L | H | L | L | H | 20 | 20 | 40 | 20 |
| H | L | H | L | H | L | 20 | 40 | 40 | 40 |
| H | H | L | L | L | L | 40 | 10 | 80 | 10 |
| H | H | L | L | L | H | 40 | 20 | 80 | 20 |
| H | H | L | L | H | L | 40 | 40 | 80 | 40 |
| L | L | L | H | L | L | 10 | 10 | 10 | 20 |
| L | L | L | H | L | H | 10 | 20 | 10 | 40 |
| L | L | L | H | H | L | 10 | 40 | 10 | 80 |
| L | L | H | H | L | L | 20 | 10 | 20 | 20 |
| L | L | H | H | L | H | 20 | 20 | 20 | 40 |
| L | L | H | H | H | L | 20 | 40 | 20 | 80 |
| L | H | L | H | L | L | 40 | 10 | 40 | 20 |
| L | H | L | H | L | H | 40 | 20 | 40 | 40 |
| L | H | L | H | H | L | 40 | 40 | 40 | 80 |
| H | L | L | H | L | L | 10 | 10 | 20 | 20 |
| H | L | L | H | L | H | 10 | 20 | 20 | 40 |
| H | L | L | H | H | L | 10 | 40 | 20 | 80 |
| H | L | H | H | L | L | 20 | 10 | 40 | 20 |
| H | L | H | H | L | H | 20 | 20 | 40 | 40 |
| H | L | H | H | H | L | 20 | 40 | 40 | 80 |
| H | H | L | H | L | L | 40 | 10 | 80 | 20 |
| H | H | L | H | L | H | 40 | 20 | 80 | 40 |
| H | H | L | H | H | L | 40 | 40 | 80 | 80 |

Referring now to TABLES 7–8, the write side and read side pin assignments reflect the destination and source FIFOs during write and read operations, respectively, in all of the six modes of operation illustrated by FIGS. 1A–1F.

TABLE 7

| | WORD | DATA INPUT PINS | | | |
|---|---|---|---|---|---|
| MODE | WIDTH | D[39:30] | D[29:20] | D[19:10] | D[9:0] |
| QUAD/MUX | 10 | F3[9:0] | F2[9:0] | F1[9:0] | F0[9:0] |
| DUAL | 10 | N/A | F2[9:0] | N/A | F0[9:0] |
|  | 20 | F2[19:10] | F2[9:0] | F0[19:10] | F0[9:0] |
| DEMUX/ | 10 | N/A | N/A | N/A | Fn[9:0] |
| MULTI-Q/ | 20 | N/A | N/A | Fn[19:10] | Fn[9:0] |
| BROADCAST | 40 | Fn[39:30] | Fn[29:20] | Fn[19:10] | Fn[9:0] |

TABLE 8

| | WORD | DATA OUTPUT PINS | | | |
|---|---|---|---|---|---|
| MODE | WIDTH | Q[39:30] | Q[29:20] | Q[19:10] | Q[9:0] |
| QUAD/DEMUX/ BROADCAST | 10 | F3[9:0] | F2[9:0] | F1[9:0] | F0[9:0] |
| DUAL | 10 | Tri-State | F2[9:0] | Tri-State | F0[9:0] |
|  | 20 | F2[19:10] | F2[9:0] | F0[19:10] | F0[9:0] |
| MUX/MULTI-Q | 10 | Tri-State | Tri-State | Tri-State | Fn[9:0] |
|  | 20 | Tri-State | Tri-State | Fn[19:10] | Fn[9:0] |
|  | 40 | Fn[39:30] | Fn[29:20] | Fn[19:10] | Fn[9:0] |

The integrated DDR/SDR flow control devices of FIGS. 1A–1F will now be described more fully with respect to FIGS. 2A–2B, which illustrate a multi-FIFO device 400 that is configured on a monolithic integrated circuit substrate. The multi-FIFO device 400 includes four independent FIFO devices, shown as FIFO0–FIFO3. These four FIFO devices are disposed at the corners of a central memory core, which is surrounded by pipelined write path circuitry, pipelined read path circuitry and flag and control logic. This memory core may comprise multi-port SRAM cells (e.g., dual-port cells) in some embodiments, however, other multi-port memory technologies may be used as well. As illustrated, the memory elements for FIFO0–FIFO3 are disposed in a quad arrangement in the top right, bottom right, top left and bottom left corners of the central memory core, respectively. A quad arrangement of memory arrays also applies to each FIFO. This quad arrangement is shown as: TR Quad, TL Quad, BR Quad and BL Quad. Each quadrant of memory elements represents a separate memory array having its own word line decoder, word line redundancy, etc (not shown).

As illustrated, the two top quadrants of memory elements (i.e., TR and TL quads) within each FIFO are separated by write/read spine control logic from the two bottom quadrants of memory elements (i.e., BR and BL quads). The write/read spine control logic within each FIFO is responsive to respective internal write clock and read clock signals: WCLKMn and RCLKMn, where n=0, 1, 2, 3. These internal write and read clock signals are generated by respective second write and read clock generators, shown as WCLK-GEN2 and RCLKGEN2. These internal clock signals may be generated at frequencies equal to about 200 MHz and higher.

The multi-FIFO device 400 will be described herein as having a total capacity of 5.24 Meg, with each FIFO having a capacity of 1.31 Meg and each of the four quadrant of memory elements within each FIFO having a capacity of 512×640 memory elements, where 512 equals the number of active rows and 640 equals the number of active columns (excluding redundant rows and columns, not shown herein).

The write/read spine control logic associated with each FIFOn receives write data from a plurality of pairs of differential write IO lines during write operations and passes read data onto a plurality of pairs of differential read IO lines during read operations. These write and read IO lines extend in a vertical direction across the memory core. These write IO lines are electrically connected to a respective write IO control circuit at the top of the memory core and the read IO lines are electrically connected to a respective read IO control circuit at the bottom of the memory core. These write and read IO control circuits are responsive to internal write and read clock signals WCLKNn and RCLKNn, which are generated by the second write and read clock generators WCLKGEN2 and RCLKGEN2.

Each of the four write IO control circuits that is located adjacent a top of the memory core receives write data from a data input bus (DIN BUS), which is illustrated as spanning an entire width of the integrated circuit substrate. As illustrated more fully by FIGS. 3B–3D, the write data is routed from the data input bus to the write IO control circuits using a plurality of data input multiplexers (DIN MUXES), which may be 8:1 multiplexers, as described herein. This write data is provided from data input pins on a packaged device, which are coupled to respective data input pads (shown as DIN PADS[39:0]), to data input control logic and drivers, which are electrically coupled to the data input bus DIN BUS. As illustrated by FIG. 2A and more fully by FIG. 3A, the data input control logic and drivers are responsive to internal write clock signals WCLKDn, which are generated by a first internal write clock generator WCLKGEN1. This first internal write clock generator WCLKGEN1 is illustrated as being responsive to four external write clock signals EXTWCLKn, which are provided to pins of the packaged device. These external write clock signals EXTWCLKn are typically asynchronous relative to each other.

The four read IO control circuits that are located adjacent a bottom of the memory core includes bus drivers that are configured to drive a data output bus (DOUT BUS) with read data passed down from the write/read spine control logic. In particular, the bus drivers within the read IO control circuits are configured to drive the data output bus via the data output multiplexers, which may be configured as 1:8 multiplexers. This read data passes from the data output bus to the data output control logic, which includes off-chip drivers that are electrically connected to data output pads (shown as DOUT PADS[39:0]). The data output control logic and off-chip drivers are responsive to a plurality of internal read clock signals RCLKDn, which are generated by a first internal read clock generator RCLKGEN1. This first internal read clock generator RCLKGEN1 is illustrated as being responsive to four external read clock signals EXTRCLKn, which are provided to pins of the packaged device. These external read clock signals EXTRCLKn are typically asynchronous relative to each other. Although illustrated by separate blocks, the first and second write clock generators WCLKGEN1 and WCLKGEN2 may be configured as one contiguous write clock generator circuit that is responsive to the external write clock signals EXTWCLKn. Similarly, the first and second read clock generators RCLKGEN1 and RCLKGEN2 may be configured as one contiguous read clock generator circuit that is responsive to the external read clock signals EXTRCLKn.

Figure 6A:
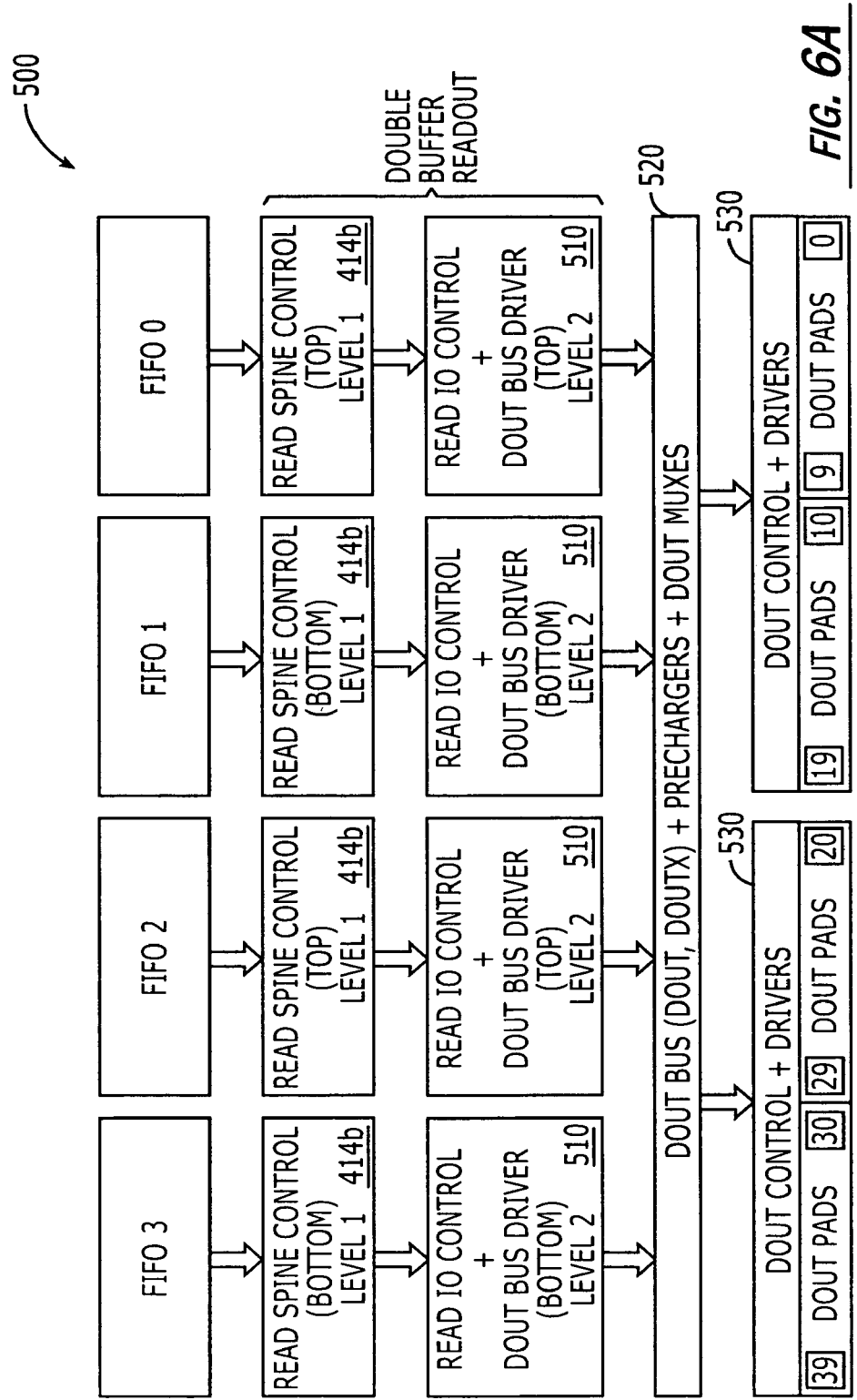
FIG. 6A is a block diagram that illustrates the vertical read path in the multi-FIFO device of FIG. 2A.
Figure 6B:
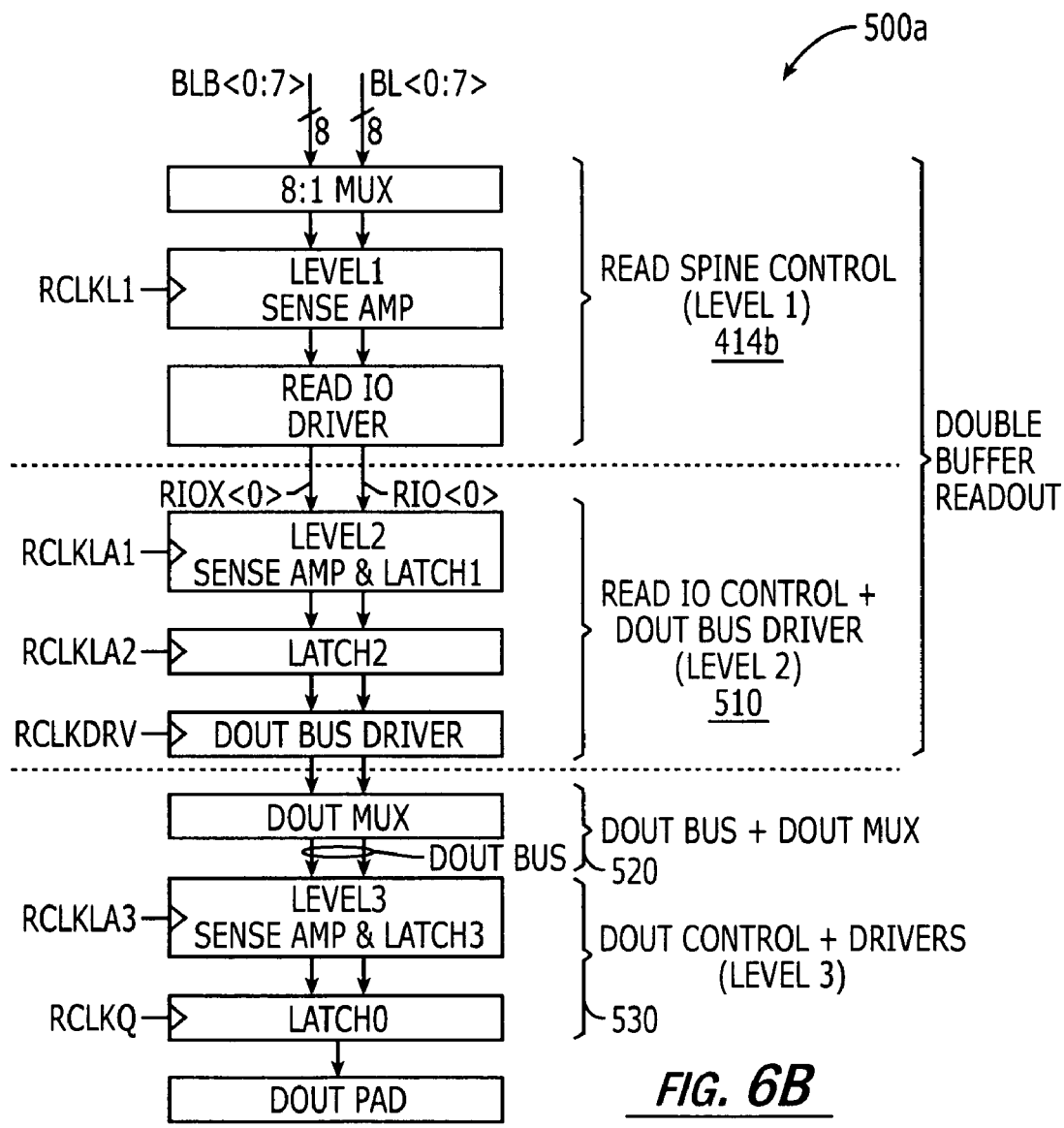
FIG. 6B is a bit slice of the vertical read path illustrated by FIG. 6A.

The separate and independent nature of the pipelined write paths for the four FIFOs, which include the write IO control logic and write spine control logic, and the separate and independent nature of the pipelined read paths, which include the read spine control logic and the read IO control logic, operate to support independent write path and read path queue switching when the plurality of FIFO memory devices are disposed in a multi-Q mode of operation. The pipelined nature of the write paths, which share a common data input bus (DIN BUS), and the pipelined nature of the read paths, which share a common data output bus (DOUT BUS), support write path queue switching that is free of write word fall-through and read path queue switching that is free of read word fall-through. In other words, none of the independent write path and read path pipelines need to be purged of data associated with a respective FIFO (i.e., queue) when a queue switching operation is being performed during a multi-Q mode of operation. Write path and read path queue switching can also be performed every write or every read cycle, respectively, in both SDR and DDR modes. This is because the read and write pipelines associated with a queue need not be refilled when a queue switching operation is being performed. The independent nature of the four pipelined read paths is best illustrated by FIGS. 6A–6B and the same degree of independent pipelining applies to the write paths as well.

Figure 2A:
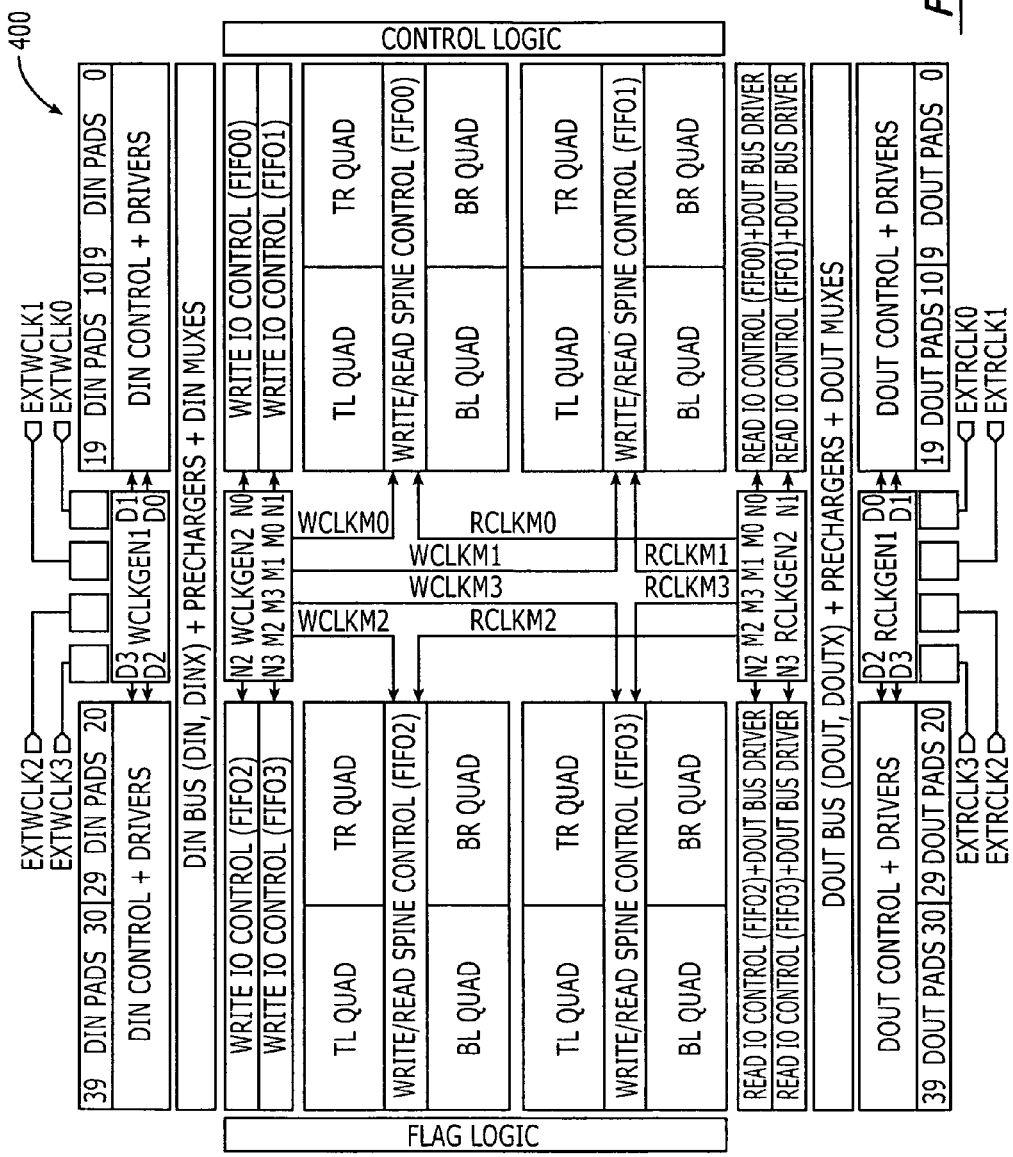
FIG. 2A is a block diagram of an integrated multi-FIFO memory device according to embodiments of the present invention.

The flag logic illustrated in FIG. 2A is configured to evaluate an empty condition (or almost empty condition) in a FIFOn by comparing a write counter value that is generated off a trailing edge of the write clock signal WCLKn against a read counter value that is generated off a leading edge of the read clock signal RCLKn when the FIFOn is disposed in the DDR write mode. This flag logic is further configured to evaluate a full condition (or almost full condition) in the FIFOn by comparing a read counter value that is generated off a trailing edge of the read clock signal RCLKn against a write counter value that is generated off a leading edge of the write clock signal WCLKn when the FIFO memory device is disposed in the DDR read mode.

Figure 2B:
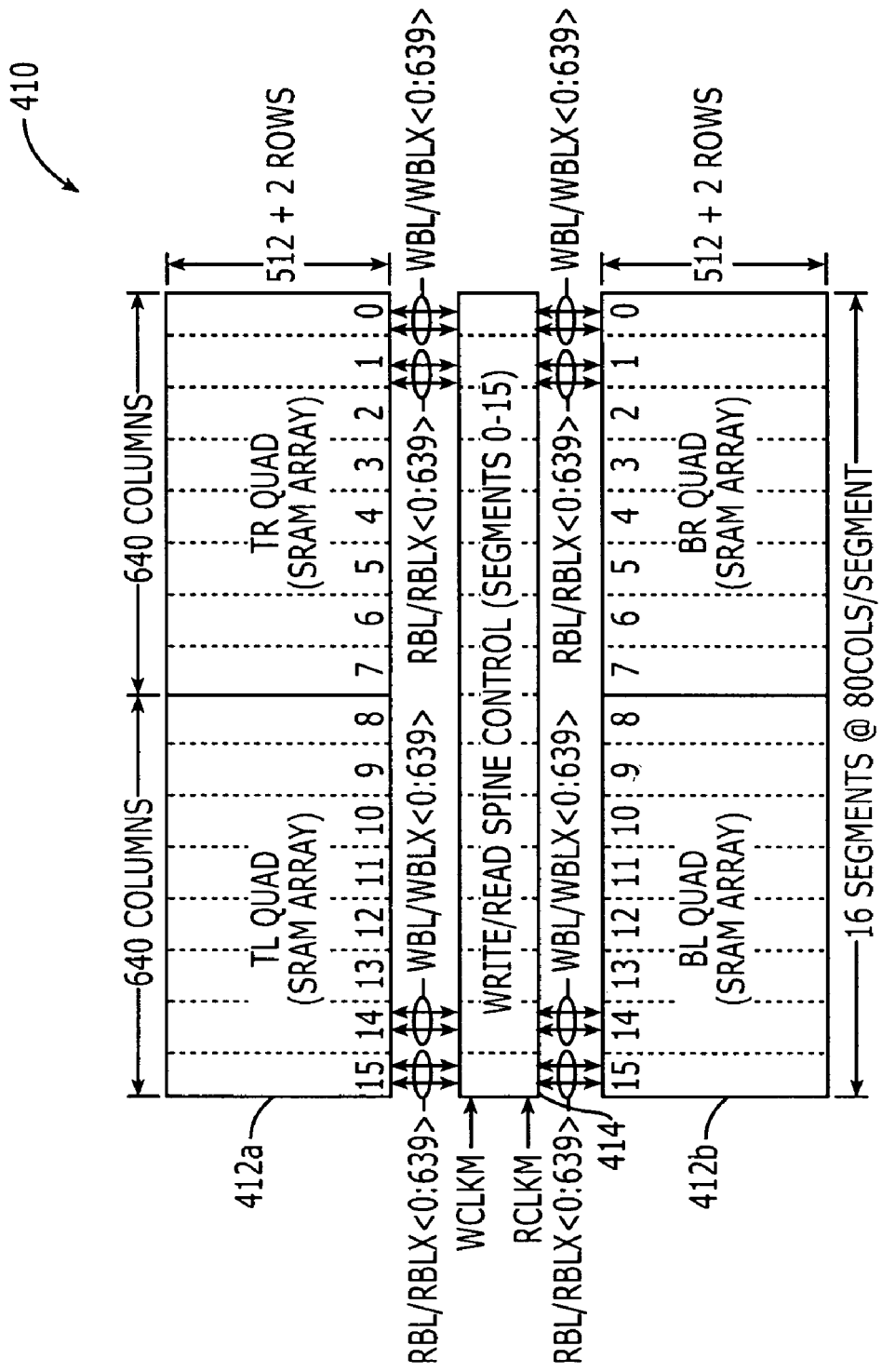
FIG. 2B is a block diagram that illustrates a quad arrangement of memory arrays and spine control circuitry that define a memory core portion of a FIFO memory device in FIG. 2A.

Each of the four FIFOs illustrated by FIG. 2A may be configured in accordance with the FIFO 410 of FIG. 2B. This FIFO 410 may be partitioned into sixteen (16) segments that span 1280 columns of memory elements. The FIFO 410 includes a top pair of quadrants 412*a* of memory elements and a bottom pair of quadrants 412*b* of memory elements. These top and bottom pairs of quadrants 412*a* and 412*b* are separated by write/read spine control logic 414, which is responsive to respective write and read clock signals WCLKM and RCLKM. Each quad of memory elements includes 512 rows of memory elements plus two additional rows of memory elements that are used to prevent the overwrite of data that has not been read from the FIFO 410 when the FIFO 410 is full. In particular, if the FIFO 410 is being operated with its full depth, then the two additional rows in the bottom quadrants 412*b* of the FIFO 410 can be written to when the FIFO 410 is at the full condition. In this case, if the read pointer is still pointing to the first row in the top quadrants 412*a*, then write operations performed at the full condition will not operate to overwrite the data in the first row of the top quadrants 412*a*. The data that is written into the additional rows of memory elements will be available for reading once the full condition is removed.

As illustrated by FIG. 2B, each quadrant of memory elements is electrically coupled to: (i) 640 pairs of differential write bit lines WBL/WBLX<0:639> that are driven rail-to-rail by the write spine control logic 414 during write operations and (ii) 640 pairs of differential read bit lines RBL/RBLX<0:639> that are sensed by the read spine control logic 414 during read operations. Each segment of memory elements spans 80 columns within a quadrant and is associated with ten (10) pairs of write IO lines and ten (10) pairs of read IO lines. As described herein, each pair of write IO lines and read IO lines is shielded from an immediately adjacent pair of write or read IO lines by a noise suppressing shield line that may be held at a positive supply voltage (e.g., Vdd). Accordingly, each segment of 80 columns of memory elements is overlapped by 60 vertical IO and shield lines, which may be formed using a high level of metallization. These 60 vertical lines include: 20 shield lines and 40 write IO lines in the region extending between the write IO control logic and the top write/read spine control logic (for FIFO0 or FIFO2), or 20 shield lines and 20 write IO lines and 20 read IO lines in the region extending between the top write/read spine control logic and bottom write/read spine control logic, or 20 shield lines and 40 read IO lines in the region extending between the bottom write/read spine control logic (for FIFO1 or FIFO3) and the read IO control logic.

Figure 3A:
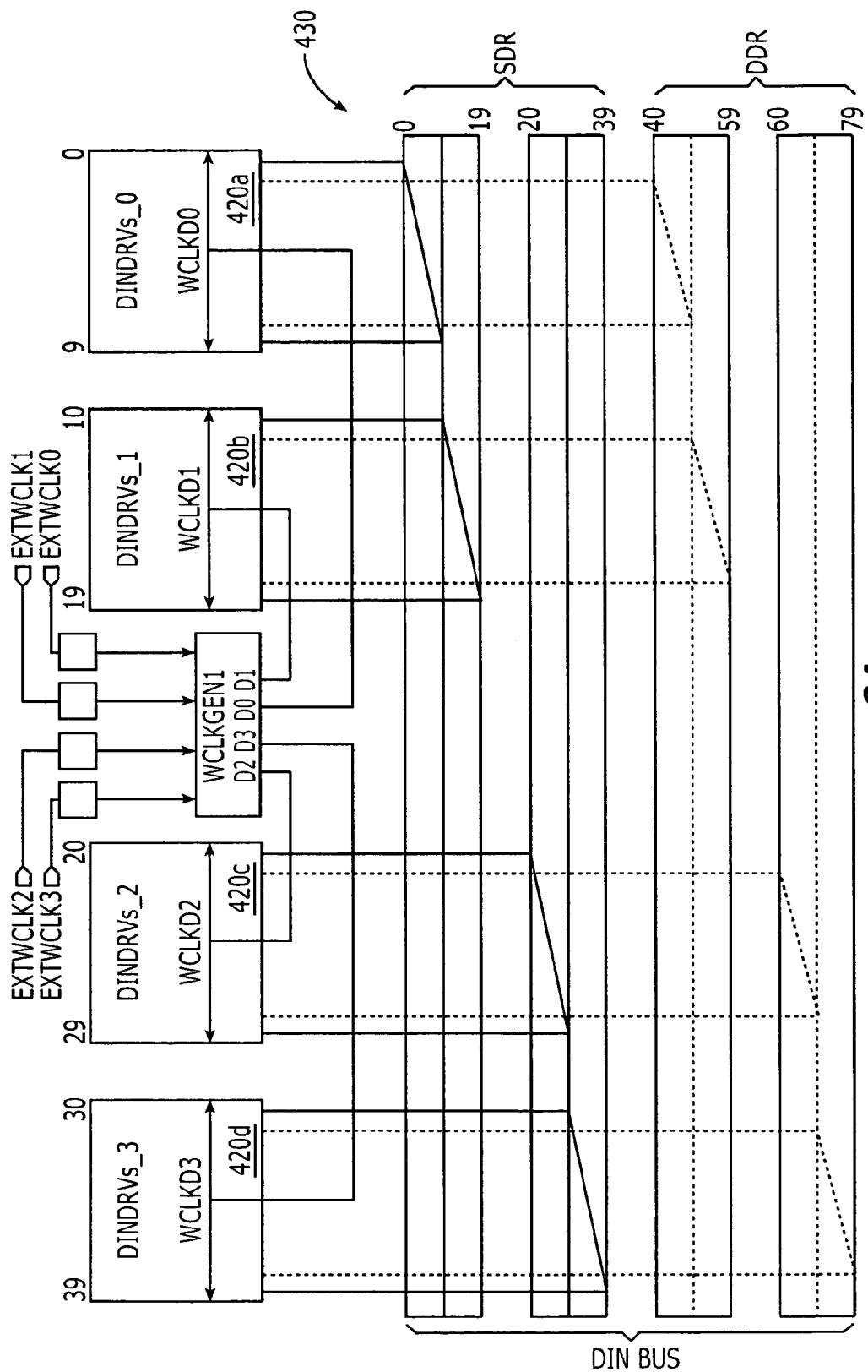
FIG. 3A illustrates a shared portion of a write data path associated with the multi-FIFO memory device of FIG. 2A, which includes a write clock generator, data input drivers and a 80b-bit wide data input bus.

In FIG. 3A, aspects of the data input bus (DIN BUS) and data input drivers illustrated by FIG. 2A are illustrated in greater detail. In particular, a quad grouping of data input drivers 420*a*–420*d* are illustrated as being electrically coupled to respective segments of a data input bus 430 (DIN BUS). When provided with write data and configured to operate at a single data rate (SDR), the data input drivers DINDRVs_0 associated with DIN PADS 0–9 provide write data to the first segment of horizontal data input bus lines DIN BUS<0:9>. However, when configured to operate at a dual data rate (DDR), the data input drivers DINDRVs_0 provide write data to the first segment of horizontal data input bus lines DIN BUS<0:9> on a leading edge of the corresponding write clock signal WCLKD0 and then provide write data to the fifth segment of horizontal data input bus lines DIN BUS<40:49> on a trailing edge of the corresponding write clock signal WCLKD0. Likewise, the data input drivers DINDRVs_1 associated with DIN PADS 10–19 can be configured to provide write data to the second and sixth segments of horizontal data input bus lines DIN BUS<10:19> and <50:59> and the data input drivers DIN-DRVs_2 associated with DIN PADS 20–29 can be configured to provide write data to the third and seventh segments of horizontal data input bus lines DIN BUS<20:29> and <60:69>. Finally, the data input drivers DINDRVs_3 associated with DIN PADS 20–39 can be configured to provide write data to the fourth and eighth segments of horizontal data input bus lines DIN BUS<30:39> and <70:79>.

Figure 3B:
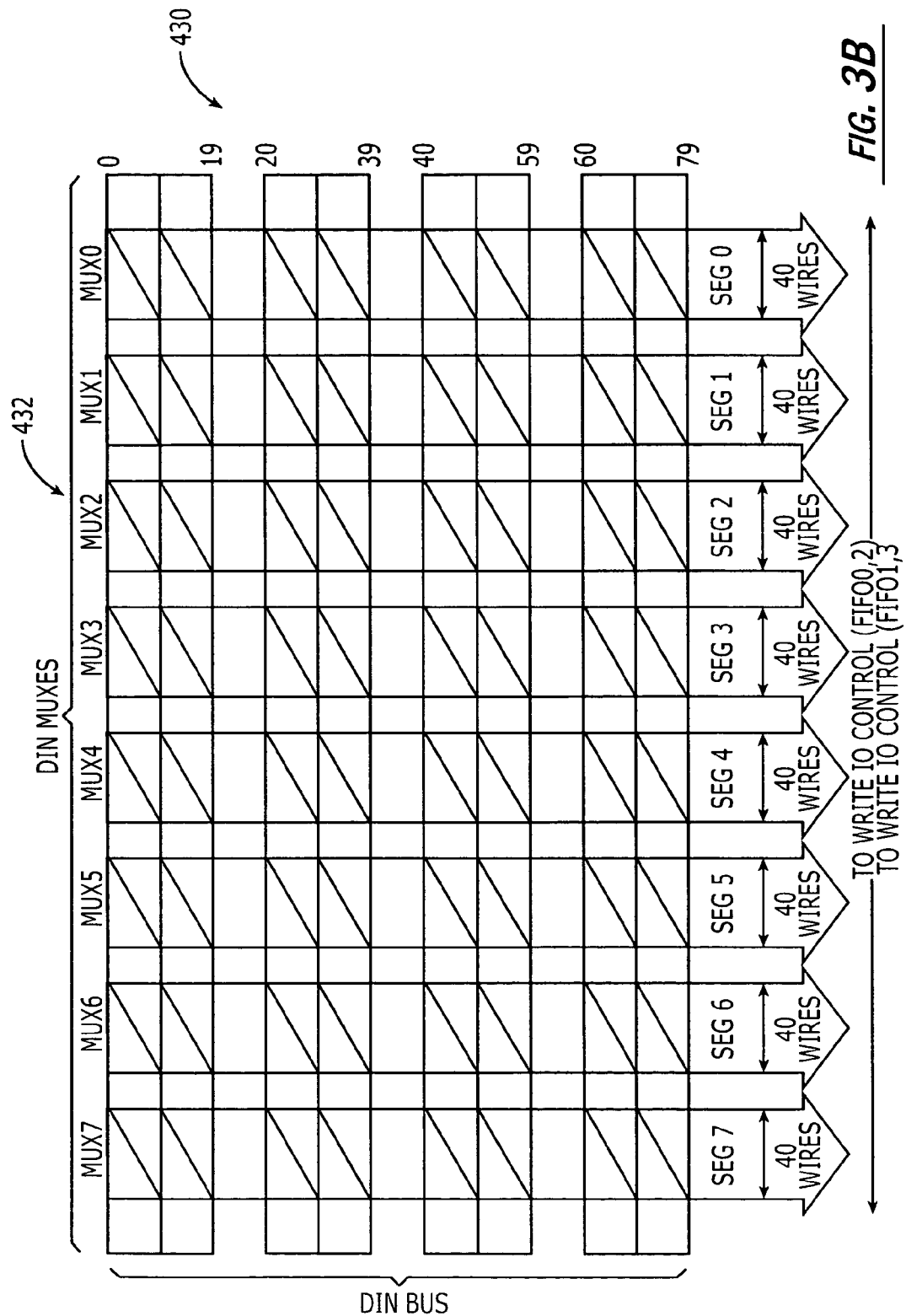
FIGS. 3B–3C illustrates the routing of write data through a plurality of data input (DIN) muxes, according to the multi-FIFO memory device of FIG. 2A.
Figure 3C:
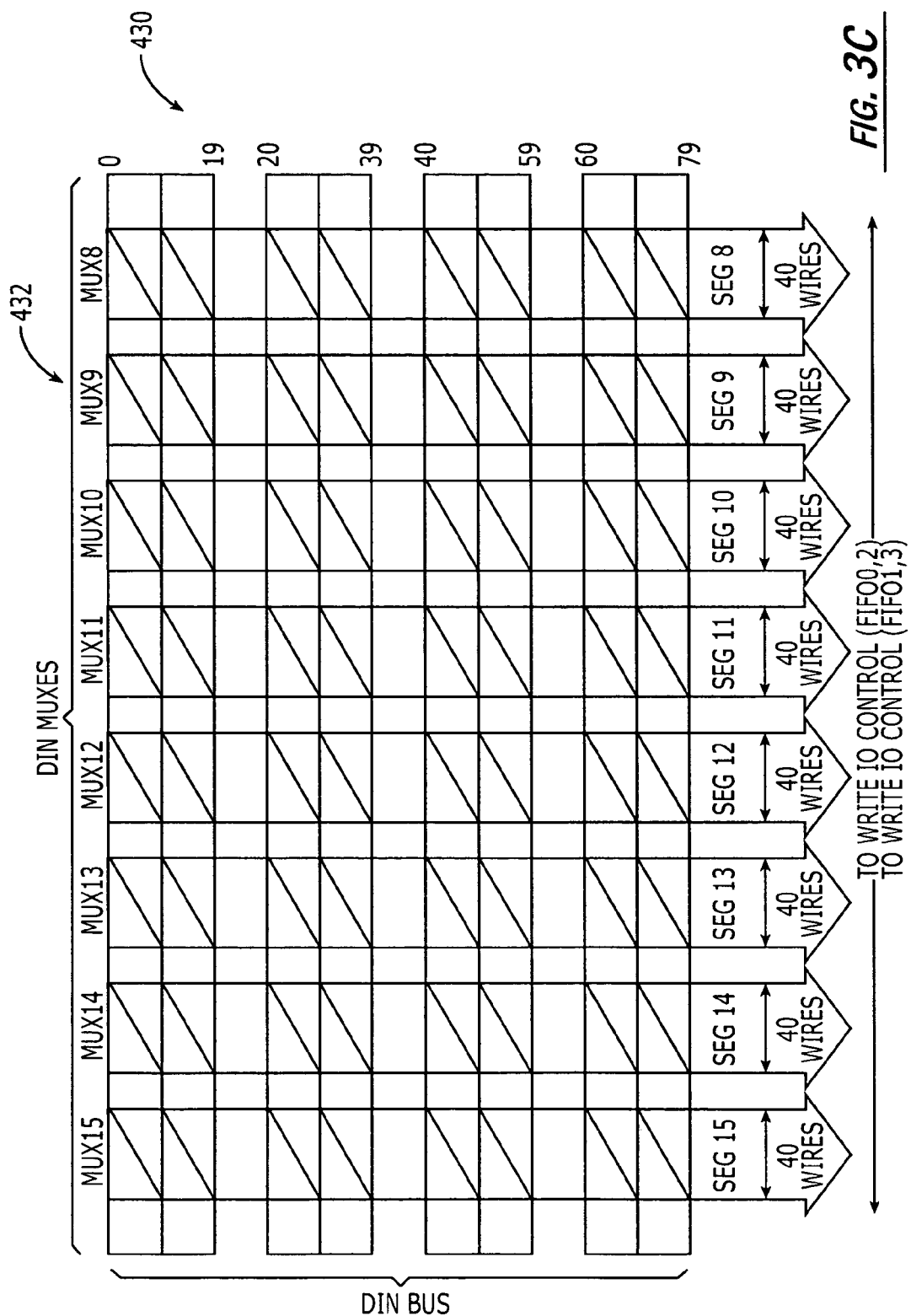

The data input multiplexers (DIN MUXES) associated with the right side (or left side) of the data input bus (DIN BUS) of FIG. 2A are illustrated by FIGS. 3B–3D. In particular, FIG. 3B illustrates the 8:1 multiplexers 432 (MUX0–MUX7) associated with the right quadrants of memory elements in FIFO0 and FIFO1 (or FIFO2 and FIFO3) and FIG. 3C illustrates the 8:1 multiplexers 432 (MUX8–MUX15) associated with the left quadrants of memory elements in FIFO0 and FIFO1 (or FIFO2 and FIFO3). Control circuitry (not shown) is provided so that these multiplexers can support the modes of operation illustrated by FIGS. 1A–1F. The 40 vertical wires associated with each MUX include 10 pairs of differential write signal lines that terminate with the write IO control logic for FIFO0 (or FIFO2) and 10 pairs of write differential signal lines that terminate with the write IO control logic for FIFO1 (or FIFO3). These pairs of differential write signal lines are described herein using the notation: WPROG and WPROGX.

In FIG. 3D, a one-eighth portion of MUX0 is illustrated in greater detail. Each horizontal pair of differential data input bus lines in the DIN BUS is illustrated as being shielded from an adjacent pair of differential data input bus lines by a respective shield line, which may be held at a fixed potential (e.g., Vdd). These shield lines operate to reduce noise caused by signal coupling between adjacent pairs of lines. Each multiplexer element that may be opened or closed to provide a routing path is illustrated by a dotted circle. When writing from DIN BUS<0:9> to segment 0 of FIFO0 (or FIFO 2), 10 bits of write data will pass from the horizontal data input bus to the vertical lines WPROG/WPROGX<0:9> associated with the corresponding write IO control logic (top or bottom).

Figures 3E, 3F:
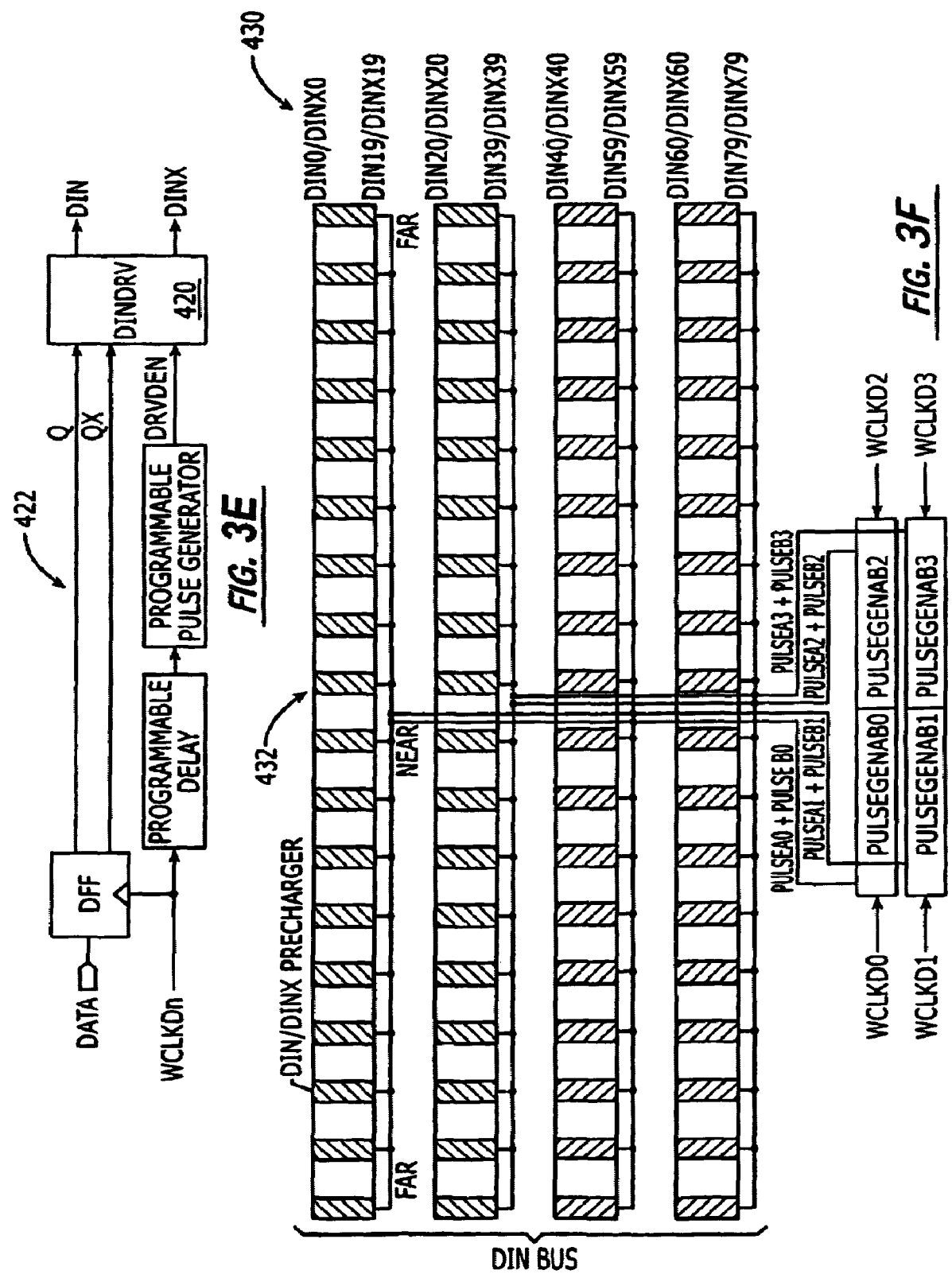
FIG. 3E is a block diagram of a portion of the data input control and driver circuit illustrated by FIG. 2A.
FIG. 3F is a block diagram of a portion of the data input bus and prechargers illustrated by FIG. 2A.

FIG. 3E illustrates one bit slice 422 of the data input control and driver circuit of FIGS. 2A and 3A. This bit slice 422 includes a D-type flip-flop (DFF), a programmable delay unit, a programmable pulse generator and a bus driver unit 420. The flip-flop and programmable delay unit receive a corresponding write clock signal WCLKDn. The D-type flip-flop is illustrated as a positive edge triggered device that converts a single-sided write data value at a data input pad to a differential input data value (at outputs Q and QX), which may represent a rail-to-rail signal. The programmable delay unit may have fixed and variable delay elements therein that delay the write clock signal WCLKDn by a desired delay amount. The programmable pulse generator generates a driver enable signal DRVEN as an active high pulse that causes the bus driver unit 420 to drive a respective pair of lines within the horizontal DIN BUS 430 with a differential signal that reflects the value of the differential input data Q and QX. As described more fully hereinbelow, this differential signal may be a 200 mV differential signal relative to a precharged positive supply voltage (e.g., Vdd=2.5 V). Another bit slice (not shown) that is active during a DDR write operation is essentially equivalent to the illustrated bit slice 422 of FIG. 3E, however, the D-type flip-flop is a negative edge triggered device. This additional bit slice includes a bus driver unit that is configured to drive another pair of lines within the DIN BUS 430 with differential signals, as illustrated by the dotted lines in FIG. 3A. Accordingly, each data input pad is electrically coupled to a pair of D-type flip-flops that are synchronized with opposite edges of a write clock signal WCLKDn during DDR write operations. For example, in a x40 DDR write mode, 40 bits of data will be captured in-sync with a rising edge of a write clock signal and then 40 additional bits of data will be captured in-sync with a falling edge of the write clock signal. After all 80 bits have been captured, then internal signals are generated to drive all 80 bits onto the horizontal DIN BUS 430.

Figure 3G:
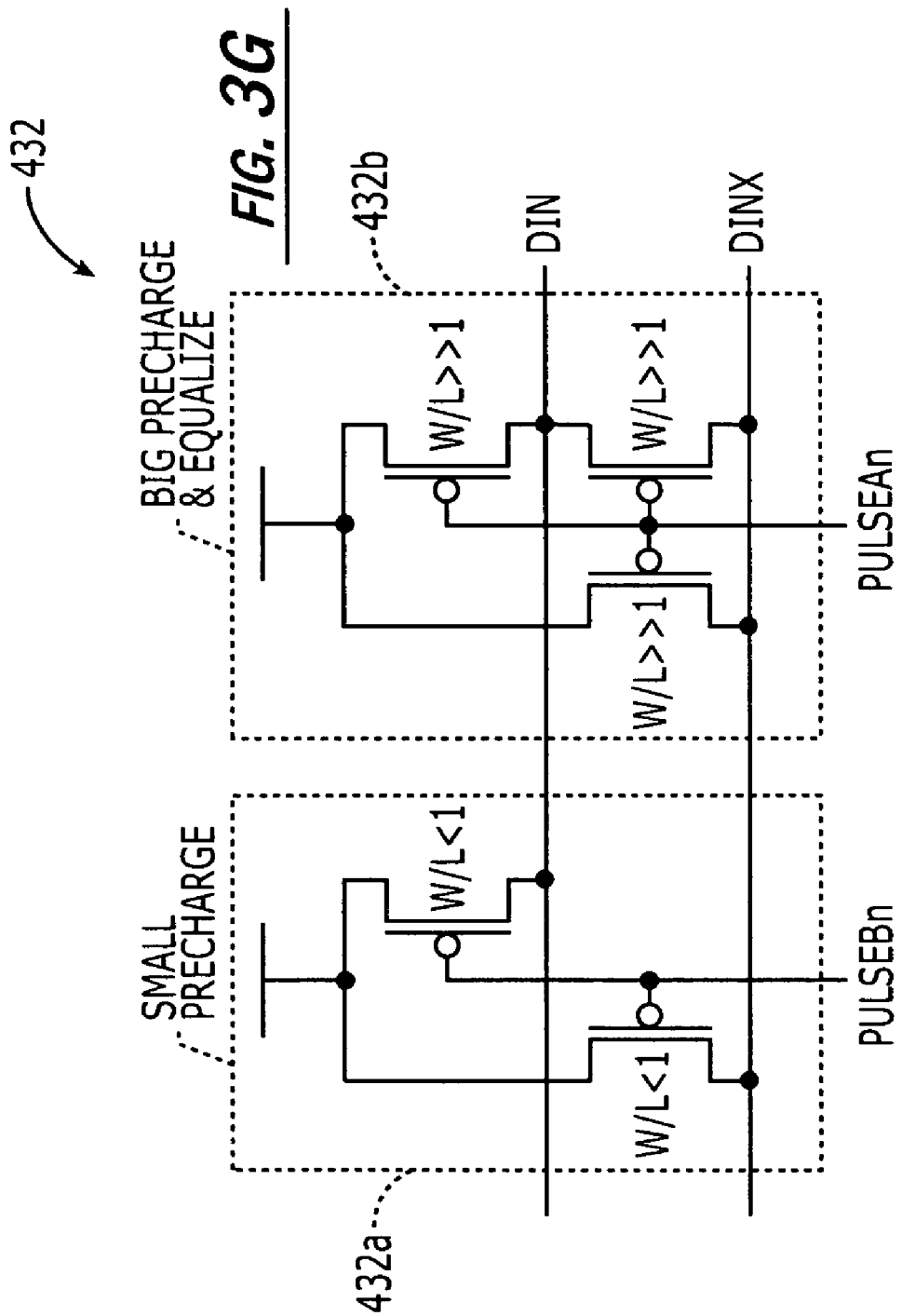
FIG. 3G is an electrical schematic of a precharger illustrated by FIG. 3F.

Operations to precharge and drive respective pairs of data input bus lines within the horizontal DIN BUS 430 with differential signals will now be described more fully with respect to FIGS. 3F–3H. In FIG. 3F, the horizontal DIN BUS 430 is illustrated as including a plurality of DIN/DINX prechargers 432 that are arranged at spaced intervals from left to right across the full width of the DIN BUS. The prechargers 432 that are located relatively near the center of the integrated circuit substrate are designated by the reference NEAR and the prechargers 432 located on the far right or far left of the substrate are designated by the reference FAR. These designations will signify differences in the timing of the operations to precharge and equalize the data input bus lines. As illustrated by FIG. 3G, each precharger 432 includes a "small" precharger unit 432*a*, which is operative to compensate for charge leakage on already precharged data input bus lines, and a "big" precharger and equalizer unit 432*b*, which is operative to restore a pair of data input lines to precharged levels after a write operation. The small precharger unit 432a is enabled by one active low precharge signal (shown as PULSEBn) and the big precharger and equalizer unit 432b is enabled by another active low precharge signal (shown as PULSEAn). The PMOS transistors within the small precharger unit 432a are illustrated as being relatively narrow transistors that can exert a relatively weak pull-up force on a corresponding pair of the data input bus lines (e.g., DIN and DINX). In contrast, the PMOS transistors within the big precharger and equalizer unit 432b are illustrated as being relatively wide transistors that can exert a strong pull-up force on a pair of data input bus lines.

The active low precharge signals PULSEAn and PULSEBn (where n=0, 1, 2 and 3) are generated by a plurality of pulse generators, which are responsive to respective write clock signals WCLKDn. These pulse generators are illustrated in FIG. 3F as PULSEGENABn. The pulse generator that is responsive to the write clock signal WCLKD0 controls precharging operations on DIN BUS<0:9> and DIN BUS<40:49> and the pulse generator that is responsive to the write clock signal WCLKD1 controls precharging operations on DIN BUS<10:19> and DIN BUS<50:59>. Similarly, the pulse generator that is responsive to the write clock signal WCLKD2 controls precharging operations on DIN BUS<20:29> and DIN BUS<60:69> and the pulse generator that is responsive to the write clock signal WCLKD3 controls precharging operations on DIN BUS<30:39> and DIN BUS<70:79>.

The timing of operations performed by the write data path components illustrated by FIGS. 3A–3G will now be described more fully with respect to the timing diagram of FIG. 3H. In particular, FIG. 3H will now be described in a manner that highlights the timing of a single bit of write data as it passes from DIN PAD0 to the write IO control logic associated with a corresponding FIFO during a write operation. This timing is controlled by an external write clock signal EXTWCLKn (where n=0) that is received and used by the first write clock generator WCLKGEN1 to generate a corresponding internal write clock signal WCLKDn. A rising edge of the internal write clock signal WCLKDn causes the D-type flip-flop associated with DIN PAD0 to latch in new write data and pass this new data as a rail-to-rail differential signal (Q and QX) to the corresponding data input driver DINDRV 420 (see, e.g., FIG. 3E). This rising edge of the internal write clock signal WCLKDn also results in the generation of an active high driver enable signal DRVDEN by the programmable pulse generator. In response to a leading edge of the driver enable signal DRVDEN, the data input driver DINDRV 420 drives a corresponding pair of data input bus lines (DIN and DINX) with a differential signal that passes through a selected mux element within a DIN MUX (see, e.g., FIG. 3D). This differential signal is a small swing signal that signifies a logic 1 value when DIN=Vdd and DINX=(Vdd−200 mV) or signifies a logic 0 value when DINX=Vdd and DIN=(Vdd−200 mV). These logic values are identified by the "1", "0", "1" sequence for DINX/DIN in FIG. 3H. The use of small swing signals supports the 200 MHz and higher clock rates.

The timing of the leading edge of the driver enable signal DRVDEN is preceded by a turn off of the small precharger unit 432a. This turn off operation is illustrated in FIG. 3H by the low-to-high transition of the PULSEBn signal, which is illustrated as a "near" signal that is received by the small precharger units 432a near the center of the substrate and a "far" signal that is received by the small precharger units 432a located near the left and right sides of the substrate.

The write data signals WPROGX/WPROG, which are passed vertically from a data input multiplexer (DIN MUX) to the write IO control logic, reflect the value of the data on the corresponding data input lines DINX/DIN. As illustrated by the dotted lines associated with the signals WPROGX/WPROG in FIG. 3H, the timing of the signals WPROGX/WPROG can vary depending on the relative locations of the corresponding data input driver 420 that is driving the data input bus DIN BUS and the location of the vertical 8:1 input multiplexer that is passing the "horizontal" data input signal DINX/DIN as a "vertical" WPROGX/WPROG signal. After a sufficient amount of time has passed to enable capture of the WPROGX/WPROG signals by the corresponding write IO control logic, the corresponding data input bus lines DINX/DIN are again precharged to logic 1 levels. This precharging operation is performed in response to the high-to-low transition of the corresponding PULSEAn signal, which is accompanied by a high-to-low transition of the corresponding PULSEBn signal as well. This high-to-low transition of the PULSEAn signal operates to precharge and equalize corresponding data input bus lines DINX/DIN to Vdd and prepare these lines for a subsequent write operation.

Referring again to FIG. 2A, each of the write IO control logic blocks is responsive to a corresponding write clock signal WCLKNn that is passed from the center of the substrate to the far right or far left side of the corresponding write IO control logic. This clock signal WCLKNn is illustrated at the bottom of FIG. 3H in order to reflect the timing of when the corresponding write IO control logic operates to latch in the value of the data reflected on the corresponding vertical WPROGX/WPROG lines. The dotted lines associated with this write clock signal WCLKNn reflect the delay in passing this clock signal across the substrate. The data latching operation by the write IO control logic is performed in-sync with a write control clock signal WCTRX, which is generated by a respective pulse generator (not shown) that receives the write clock signal WCLKNn as an input.

Figure 4A:
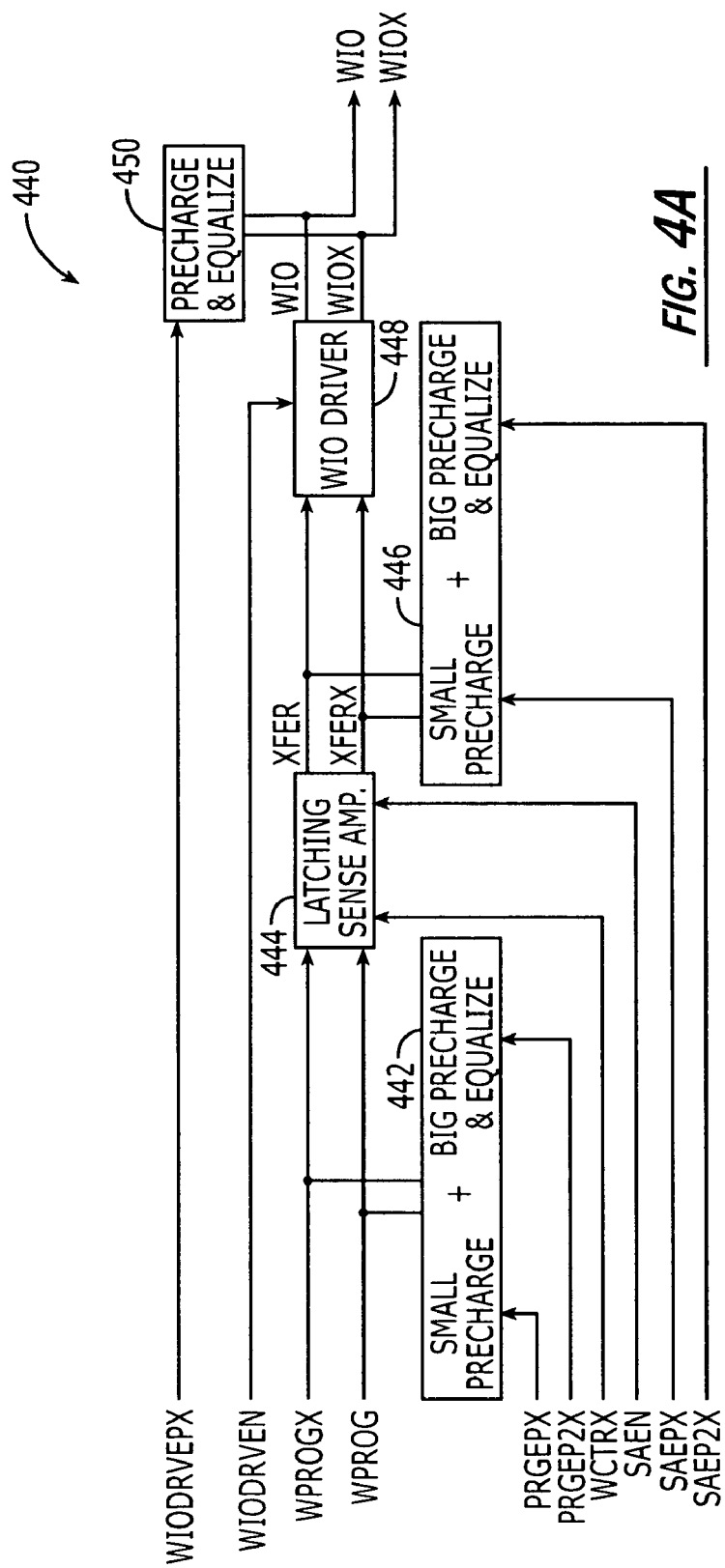
FIG. 4A is an electrical schematic of a bit slice of the write IO control logic of FIG. 2A, according to embodiments of the present invention.
Figure 4B:
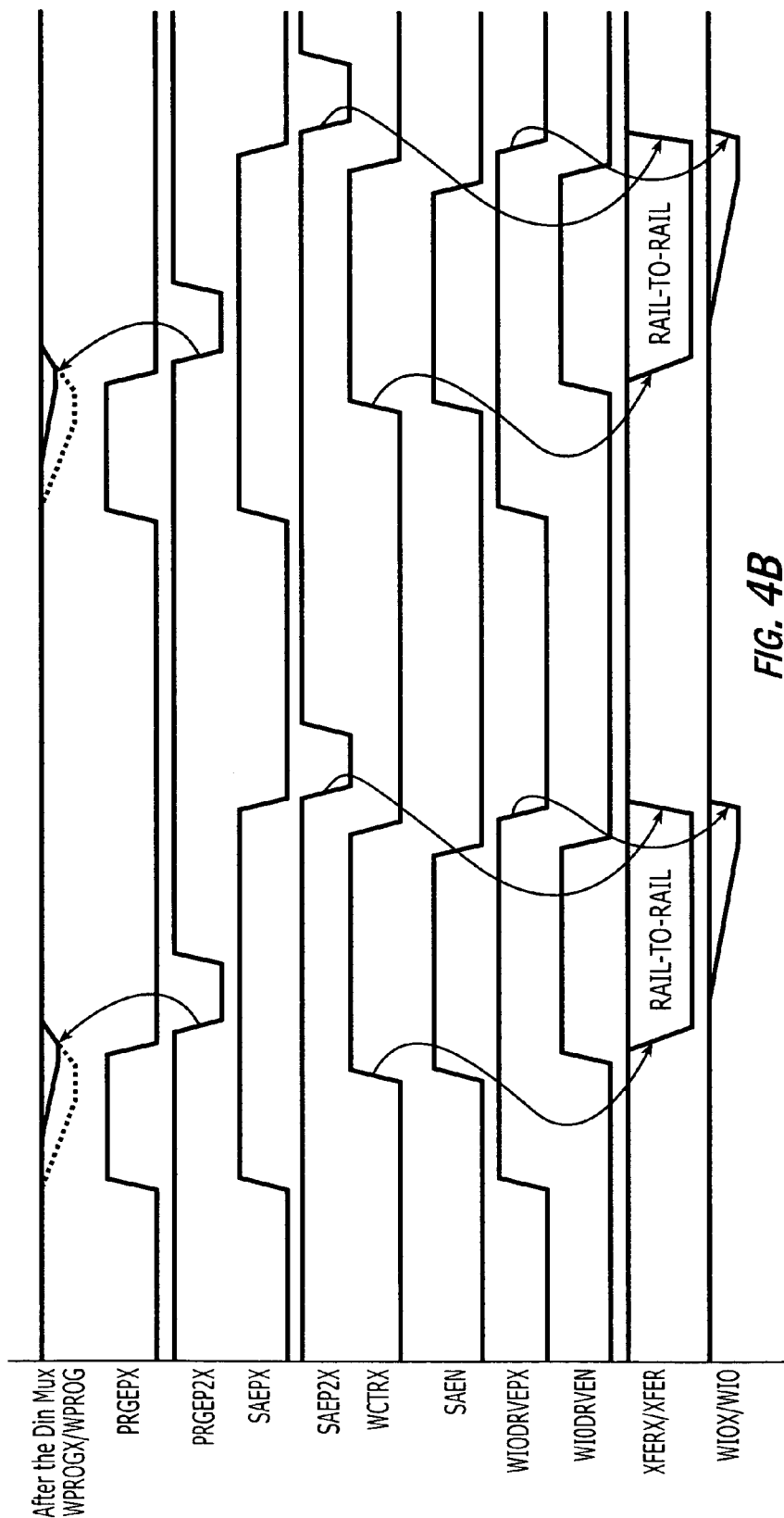
FIG. 4B is a timing diagram that illustrates operation of the write IO control logic of FIG. 4A.

Referring now to FIG. 4A, a bit slice 440 of the write IO control logic of FIG. 2A is illustrated as including first and second precharge units 442 and 446, a latching sense amplifier 444, a write IO driver 448 and a write IO precharge circuit 450. The first precharge unit 442 includes a small precharge unit that is responsive to an active low precharge signal PRGEPX and a big precharge and equalizing unit that is responsive to an active low precharge signal PRGEP2X. These precharge units may be similar to the precharge units 432a and 432b illustrated by FIG. 3G. The first precharge unit 442 performs the function of precharging a pair of vertical WPROG and WPROGX lines that extend downward from the data input muxes (DIN MUX) illustrated by FIGS. 3B–3D. The timing of these active low precharge signals PRGEPX and PRGEP2X is illustrated by FIG. 4B. In particular, the precharge signal PRGEPX is a signal that is frequently low in order to compensate for charge leakage on the vertical WPROG and WPROGX lines, whereas the signal PRGEP2X is only low when necessary to reset the vertical WPROG and WPROGX lines to precharged levels in anticipation of a subsequent write operation.

The second precharge unit 446 includes a small precharge unit that is responsive to an active low precharge signal SAEPX and a big precharge and equalizing unit that is responsive to an active low precharge signal SAEP2X. The second precharge unit 446 performs the function of precharging a pair of transfer lines XFER and XFERX that extend from the latching sense amplifier 444 to the write IO driver 448. The timing of these active low precharge signals SAEPX and SAEP2X is illustrated by FIG. 4B. In particular, the precharge signal SAEPX is a signal that is frequently low in order to compensate for charge leakage on the transfer lines XFER and XFERX, whereas the signal SAEP2X is only low when necessary to reset the transfer lines XFER and XFERX to precharged levels in anticipation of the latching operation performed by the latching sense amplifier 444.

When enabled in response to the sense amplifier enable signal SAEN, the latching sense amplifier 444 generates rail-to-rail transfer signals XFER and XFERX in-sync with a rising edge of the write control clock signal WCTRX, as illustrated by FIG. 4B. The write IO driver 448, which is enabled by an active high write IO driver enable signal WIODRVEN, operates to drive the vertical write IO lines WIO and WIOX with a small swing differential signal that matches the value of the transfer signals XFER and XFERX. This operation is illustrated at the bottom of the timing diagram of FIG. 4B, where the write IO lines WIO and WIOX are precharged in-sync with a leading edge of the active low write IO driver precharge signal WIODREPX. As described above with respect to FIGS. 2A–2B, these write IO lines WIO and WIOX extend vertically over the memory core to corresponding write/read spine control logic.

Figure 5A:
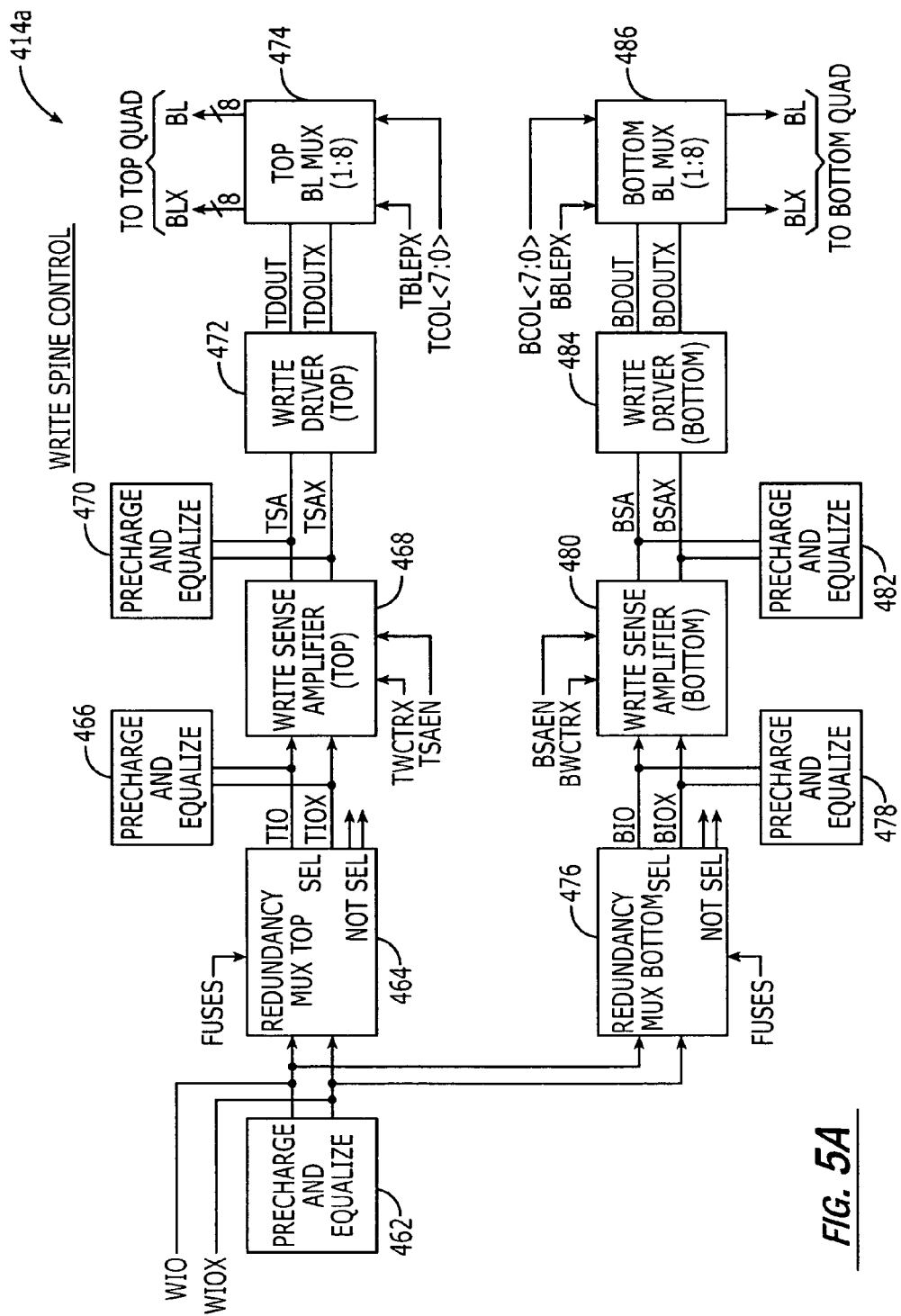
FIG. 5A is an electrical schematic of a bit slice of the write spine control logic of FIG. 2A, according to embodiments of the present invention.
Figure 5B:
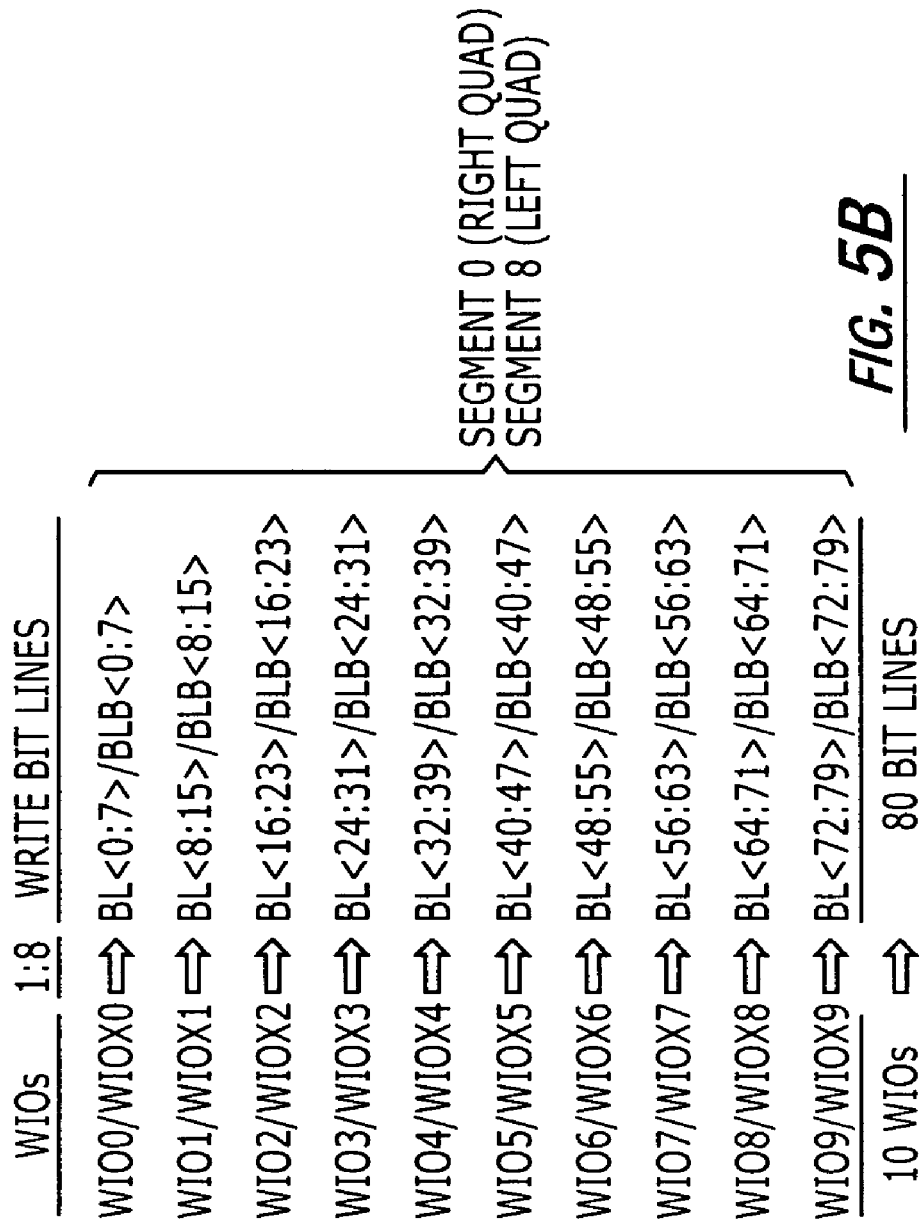
FIG. 5B illustrates a routing relationship between write input/output (IO) lines and write bit lines associated with one segment of the write spine control logic of FIG. 2A.
Figure 5C:
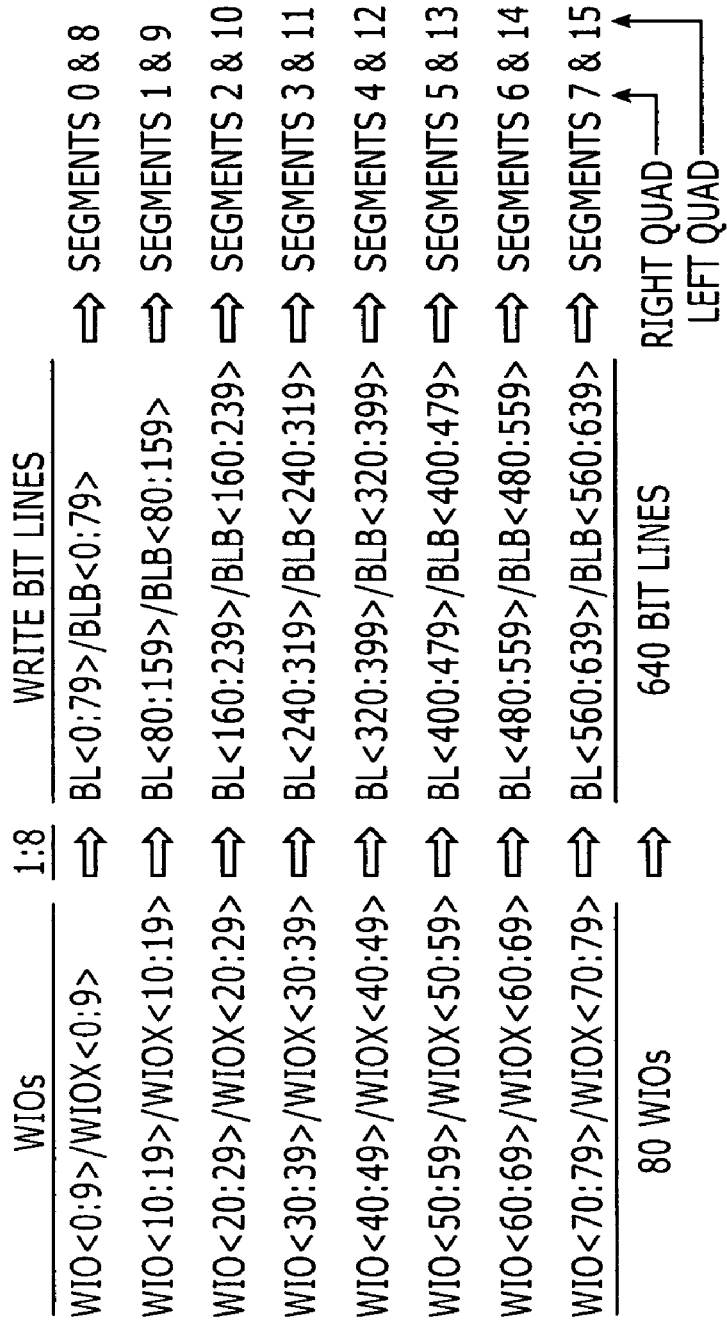
FIG. 5C illustrates a routing relationship between write input/output (IO) lines and write bit lines in the write spine control logic of FIG. 2A.

Referring now to FIGS. 5A–5C, a bit slice 414a of the write portion of the write/read spine control logic 414 of FIG. 2B will be described. This bit slice 414a is illustrated as including a precharge and equalize unit 462 that is electrically coupled to a pair of write IO lines WIO and WIOX. Top and bottom redundancy multiplexers 464 and 476 are illustrated. These multiplexers 464 and 476 are set by fuses to control which grouping of eight (8) redundant columns (corresponding to a pair of write IO lines), if any, will be used to replace a defective group of normal columns.

If the write data on WIO/WIOX is destined for a top quadrant within a FIFOn memory core, then the top IO lines TIO and TIOX receive the write data as a small swing differential signal. These top IO lines TIO and TIOX are periodically precharged to Vdd by a precharge and equalization unit 466. The small swing differential signal on the top IO lines TIO and TIOX is captured by the write sense amplifier (top) 468. This write sense amplifier 468 is responsive to a top sense enable signal TSAEN and a top write control clock signal TWCTRX. The write sense amplifier 468 generates a pair of rail-to-rail signals TSA/TSAX during a sense and amplify operation that is synchronized with a leading edge of the top write control clock signal TWCTRX. The signal lines TSA/TSAX are periodically precharged to Vdd by a precharge and equalization unit 470. The signal lines TSA/TSAX are provided to a write driver 472 that is configured to support rail-to-rail write bit line driving operations. The outputs TDOUT/TDOUTX of the write driver 472 are provided to a top bit line multiplexer 474 that performs a 1:8 selection operation. The top bit line multiplexer 474 is responsive to an active low bit line precharge signal TBLEPX and a multi-bit column selection signal TCOL<7:0>. Depending on the value of the column selection signal TCOL<7:0>, the data provided on the signal lines TDOUT/TDOUTX is routed to one of eight immediately adjacent columns within a top quad of a FIFOn. Redundant columns (not shown) may also be provided to replace one or more defective columns within a segment of memory elements.

Alternatively, if the write data on WIO/WIOX is destined for bottom quadrant within a FIFOn memory core, then the bottom IO lines BIO and BIOX receive the write data as small swing differential signal. These bottom IO lines BIO and BIOX are periodically precharged to Vdd by a precharge and equalization unit 478. The small swing differential signal on the bottom IO lines BIO and BIOX is captured by the write sense amplifier (bottom) 480. This write sense amplifier 480 is responsive to a bottom sense enable signal BSAEN and a bottom write control clock signal BWCTRX. The write sense amplifier 480 generates a pair of rail-to-rail signals BSA/BSAX during a sense and amplify operation that is synchronized with a leading edge of the bottom write control clock signal BWCTRX. The signal lines BSA/BSAX are periodically precharged to Vdd by a precharge and equalization unit 482. The signal lines BSA/BSAX are provided to a write driver 484 that is configured to support rail-to-rail write bit line driving operations. The outputs BDOUT/BDOUTX of the write driver 484 are provided to a bottom bit line multiplexer 486 that performs a 1:8 selection operation. The bottom bit line multiplexer 486 is responsive to an active low bit line precharge signal BBLEPX and a multi-bit column selection signal BCOL<7:0>. Depending on the value of the column selection signal BCOL<7:0>, the data provided on the signal lines BDOUT/BDOUTX is routed to one of eight immediately adjacent columns within a bottom quad of a FIFOn.

Thus, the bit slice 414a of FIG. 5A illustrates one-tenth of one segment of the write portion of the write/read spine control logic 414 of FIG. 2B that drives write bit lines in both the top and bottom quadrants of a memory core of a FIFOn. As described above, each quadrant of memory elements in a FIFOn is associated with 80 pairs of write IO lines (WIO<0:79>/WIOX<0:79>) and each segment of each quadrant of memory elements is associated with ten pairs of write IO lines. This relationship is reflected by FIG. 5B, where the routing of ten bits of write data from ten (10) of the bit slices 414a illustrated by FIG. 5A includes routing data on each write IO line pair (WIO/WIOX) to one of eight pairs of write bit lines in the top or bottom quadrants of memory elements. In FIG. 5C, the routing of 80 bits of write data from 80 of the bit slices 414a includes routing data on each of the 80 write IO line pairs to 80 of the 640 pairs of write bit lines in the top or bottom quadrants of memory elements.

This routing of 80 bits of write data into a selected FIFOn may correspond to a x40 DEMUX or x40 MULTI-Q write operation at a DDR write rate, as described above with respect to FIGS. 1A–1F. The sequence of write operations that fill a selected FIFOn with 80 bits of write data on each write cycle are illustrated more fully by TABLE 9. In particular, TABLE 9 illustrates how 80 bit words are routed from the write spine control logic into respective top and bottom quadrants, in a right-to-left and top-to-bottom sequence. In the first write cycle (WRITE CYCLE 1), 80 bits of write data are written into ten columns of memory elements within each of the eight segments within a quadrant. During this write cycle, 80 instances of the bit line multiplexer 474 illustrated by FIG. 5A operate to select column 0 in the top right quadrant of memory elements.

TABLE 9 also illustrates how after 640 bits of write data have been written into row 0 of the top right quadrant (TR) of memory elements during eight consecutive write cycles, a switch is made to the top left quadrant (TL) of memory elements, which represents a separate memory array having separate word lines, word line decoders, etc. After row 0 of the top left quadrant (TL) has been written to, then row 1 of the top right quadrant (TR) is accessed. This back and forth switching between the right and left quadrants continues until the top quadrants are full. Thereafter, write operations are made in a back and forth sequence between the bottom quadrants (BR and BL).

TABLE 9

FIFO WRITE OPERATIONS - 80 BIT WORDS (1.3 MEG)

| WRITE CYCLE | QUAD | ROW | COLUMNS | SEGMENTS |
|---|---|---|---|---|
| 1 | TR | 0 | 0 | 0–7 |
| 2 | TR | 0 | 1 | 0–7 |
| 3 | TR | 0 | 2 | 0–7 |
| 4 | TR | 0 | 3 | 0–7 |
| 5 | TR | 0 | 4 | 0–7 |
| 6 | TR | 0 | 5 | 0–7 |
| 7 | TR | 0 | 6 | 0–7 |
| 8 | TR | 0 | 7 | 0–7 |
| 9 | TL | 0 | 0 | 8–15 |
| 10 | TL | 0 | 1 | 8–15 |
| 11 | TL | 0 | 2 | 8–15 |
| 12 | TL | 0 | 3 | 8–15 |
| 13 | TL | 0 | 4 | 8–15 |
| 14 | TL | 0 | 5 | 8–15 |
| 15 | TL | 0 | 6 | 8–15 |
| 16 | TL | 0 | 7 | 8–15 |
| 17 | TR | 1 | 0 | 0–7 |
| 18 | TR | 1 | 1 | 0–7 |
| • | • | • | • | • |
| 8191 | TL | 511 | 6 | 8–15 |
| 8192 | TL | 511 | 7 | 8–15 |
| 8193 | BR | 0 | 0 | 0–7 |
| 8194 | BR | 0 | 1 | 0–7 |
| • | • | • | • | • |
| 16383 | BL | 511 | 6 | 8–15 |
| 16384 | BL | 511 | 7 | 8–15 |

The routing of 40 bits of write data into a selected FIFOn may correspond to a x20 DUAL mode, x20 DEMUX, or x20 MULTI-Q write operation at a DDR write rate or a x40 width mode at an SDR rate. A sequence of write operations that fill a selected FIFOn with 40 bits of write data on each write cycle are illustrated more fully by TABLE 10. In particular, TABLE 10 illustrates how sixteen 40-bit write operations are needed to fill a row of memory elements within a selected quadrant, before the next quadrant is selected. The word lines associated with each row of memory elements within a respective quadrant are operated as static word lines that remain active at high levels during multiple consecutive write cycles. In TABLE 10, sixteen consecutive write cycles are performed on a selected row before a transition is made to an adjacent quadrant, and the word line for the selected row remains high during these sixteen consecutive write cycles. Moreover, well before the time of transition from one quadrant to an adjacent quadrant during a series of write operations, the word line associated with the adjacent quadrant is precharged high to an active level and remains high until all write operations into the corresponding row have been completed. This eliminates the time delay associated with an operation to drive the word line to an active level from the speed path during write operations.

TABLE 10

FIFO WRITE OPERATIONS - 40 BIT WORDS

| WRITE CYCLE | QUAD | ROW | COLUMNS | SEGMENTS |
|---|---|---|---|---|
| 1 | TR | 0 | 0 | 0–3 |
| 2 | TR | 0 | 0 | 4–7 |
| 3 | TR | 0 | 1 | 0–3 |
| 4 | TR | 0 | 1 | 4–7 |

TABLE 10-continued

FIFO WRITE OPERATIONS - 40 BIT WORDS

| WRITE CYCLE | QUAD | ROW | COLUMNS | SEGMENTS |
|---|---|---|---|---|
| 5 | TR | 0 | 2 | 0–3 |
| 6 | TR | 0 | 2 | 4–7 |
| 7 | TR | 0 | 3 | 0–3 |
| 8 | TR | 0 | 3 | 4–7 |
| 9 | TR | 0 | 4 | 0–3 |
| 10 | TR | 0 | 4 | 4–7 |
| 11 | TR | 0 | 5 | 0–3 |
| 12 | TR | 0 | 5 | 4–7 |
| 13 | TR | 0 | 6 | 0–3 |
| 14 | TR | 0 | 6 | 4–7 |
| 15 | TR | 0 | 7 | 0–3 |
| 16 | TR | 0 | 7 | 4–7 |
| 17 | TL | 0 | 0 | 8–11 |
| 18 | TL | 0 | 1 | 12–15 |
| • | • | • | • | • |
| • | • | • | • | • |
| 32 | TL | 0 | 7 | 12–15 |
| 33 | TR | 1 | 0 | 0–3 |
| • | • | • | • | • |
| • | • | • | • | • |
| 32768 | BL | 511 | 7 | 12–15 |

The routing of 20 bits of write data into a selected FIFOn may correspond to a x10 QUAD, x10 DUAL, x10 DEMUX, or x10 MULTI-Q write operation at a DDR write rate or a x20 DUAL, x20 DEMUX, or x20 MULTI-Q write operation at an SDR rate. A sequence of write operations that fill a selected FIFOn with 20 bits of write data on each write cycle are illustrated more fully by TABLE 11. In particular, TABLE 11 illustrates how 32 20-bit write operations are needed to fill a row of memory elements within a selected quadrant, before the next quadrant is selected.

TABLE 11

FIFO WRITE OPERATIONS - 20 BIT WORDS

| WRITE CYCLE | QUAD | ROW | COLUMNS | SEGMENTS |
|---|---|---|---|---|
| 1 | TR | 0 | 0 | 0–1 |
| 2 | TR | 0 | 0 | 2–3 |
| 3 | TR | 0 | 0 | 4–5 |
| 4 | TR | 0 | 0 | 6–7 |
| 5 | TR | 0 | 1 | 0–1 |
| 6 | TR | 0 | 1 | 2–3 |
| • | • | • | • | • |
| 32 | TR | 0 | 7 | 6–7 |
| 33 | TL | 0 | 0 | 0–1 |
| 34 | TL | 0 | 0 | 2–3 |
| • | • | • | • | • |
| 64 | TL | 0 | 7 | 6–7 |
| 65 | TR | 1 | 0 | 0–1 |
| • | • | • | • | • |
| • | • | • | • | • |
| 32769 | BR | 0 | 0 | 0–1 |
| • | • | • | • | • |
| • | • | • | • | • |
| 65536 | BL | 511 | 7 | 14–15 |

The routing of 10 bits of write data into a selected FIFOn may correspond to a x10 QUAD, x10 DUAL, x10 DEMUX, or x10 MULTI-Q write operation at an SDR rate. A sequence of write operations that fill a selected FIFOn with 10 bits of write data on each write cycle are illustrated more fully by TABLE 12. In particular, TABLE 11 illustrates how 64 10-bit write operations are needed to fill a row of memory elements within a selected quadrant, before the next quadrant is selected.

TABLE 12

FIFO WRITE OPERATIONS - 10 BIT WORDS

| WRITE CYCLE | QUAD | ROW | COLUMNS | SEGMENTS |
|---|---|---|---|---|
| 1 | TR | 0 | 0 | 0 |
| 2 | TR | 0 | 0 | 1 |
| 3 | TR | 0 | 0 | 2 |
| 4 | TR | 0 | 0 | 3 |
| 5 | TR | 0 | 0 | 4 |
| 6 | TR | 0 | 0 | 5 |
| 7 | TR | 0 | 0 | 6 |
| 8 | TR | 0 | 0 | 7 |
| 9 | TR | 0 | 1 | 0 |
| 10 | TR | 0 | 1 | 1 |
| • | • | • | • | • |
| 64 | TR | 0 | 7 | 7 |
| 65 | TL | 0 | 0 | 8 |
| 66 | TL | 0 | 0 | 9 |
| 65636 | TL | 511 | 7 | 15 |
| 65637 | BR | 0 | 0 | 0 |
| • | • | • | • | • |
| 131272 | BL | 511 | 7 | 15 |

FIGS. 3A–3H, 4A–4B and 5A–5C provide a detailed description of the pipelined write paths associated with the multi-FIFO device 400 of FIGS. 2A–2B. In an analogous manner, these write paths translate to essentially equivalent read paths that extend vertically in a pipelined sequence from the read bit lines within each quadrant of memory elements, to the read spine control logic between the quadrants of each FIFO, and then to the read IO control logic, the DOUT multiplexers, the DOUT BUS and the DOUT control and drivers illustrated by FIG. 2A. This vertical read path 500 is illustrated by FIG. 6A, which shows the four FIFOs providing read data to respective read spine control logic 414b. Each of the four read paths extends downward on read IO lines from the central spine of each FIFO to the read IO control logic 510 and bus driver devices. These bus driver devices drive the read data through respective data output multiplexers (DOUT MUXES) to the data output bus 520 (DOUT BUS). (See, e.g., FIGS. 3A–3D). From the data output bus 520, read data is passed to data output control logic and drivers 530 that drive the output pads at the output port Q[39:0] (and off-chip loads) with the read data.

As illustrated by the read path bit slice 500a of FIG. 6B, each bit of read data is double buffered in a read pipeline. The first buffering occurs within the read spine control logic 414b, when the read data is latched by a latching sense amplifier that is responsive to a level 1 read clock signal (RCLK1). From there, the read data is passed down the read IO lines as a small swing differential signal (e.g., maximum swing equals 200 mV) to the read IO control logic and data output bus driver 510. The read IO control logic senses, amplifies and latches the read data in-sync with a first level 2 read clock signal RCLKLA1. The read IO control logic passes the read data as a rail-to-rail signal to a latch that is responsive to a second level 2 read clock signal RCLKLA2, which may be a delayed version of the first level 2 read clock signal RCLKLA1. These clock signals are generated by the second read clock generator RCLKGEN2 illustrated by FIG. 2A. The data output bus driver, which is responsive to a read driver clock signal RCLKDRV, drives the data output multiplexers and data output bus 520 with a small swing differential signal that is sensed and latched by a sense amplifier within the data output control logic 530. This sense amplifier is responsive to a level 3 read clock signal RCLKLA3. The read data latched by the third latch (LATCH3) is then passed to an output stage latch (LATCH0) and output pad (DOUT PAD), in-sync with a read clock signal RCLKQ that is generated by the first read clock generator RCLKGEN1.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. An integrated circuit chip, comprising:
 a plurality of first-in first-out (FIFO) memory devices that are collectively configured to support a multi-queue operating mode that provides write path queue switching, which is free of write word fall-through, on every write cycle and further provides read path queue switching, which is free of read word fall-through, on every read cycle.

2. The integrated circuit chip of claim 1, wherein each of said plurality of FIFO memory devices is configured to a support first word fall-through (FWFT) mode of operation and a standard mode of operation.

3. The integrated circuit chip of claim 1, wherein the multi-queue operating mode supports write queue pointer changes that are free of corresponding write operations.

4. The integrated circuit chip of claim 1, wherein each of said plurality of FIFO memory devices comprises a respective double-buffered read data path.

5. The integrated circuit chip of claim 4, further comprising a data output bus and data output control logic that is electrically coupled to said data output bus; and wherein the respective double-buffered read data path associated with each of said plurality of FIFO memory devices outputs through a respective multiplexer to the data output bus.

6. The integrated circuit chip of claim 4, wherein said plurality of first-in first-out (FIFO) memory devices are further configured to support the following multi-FIFO operating modes: multiplexer and demultiplexer.

7. The integrated circuit chip of claim 1, wherein said plurality of first-in first-out (FIFO) memory devices are further configured to support the following multi-FIFO operating modes: multiplexer and demultiplexer.

8. An integrated circuit chip, comprising:
 a plurality of first-in first-out (FIFO) memory devices that are collectively configured to support a multi-queue operating mode that supports write queue pointer changes that are free of corresponding write operations, wherein each of said plurality of FIFO memory devices comprises a respective double-buffered read data path.

9. The integrated circuit chip of claim 8, further comprising a data output bus and data output control logic that is electrically coupled to said data output bus; and wherein the respective double-buffered read data path associated with each of said plurality of FIFO memory devices outputs through a respective multiplexer to the data output bus.

10. The integrated circuit chip of claim 9, wherein said plurality of first-in first-out (FIFO) memory devices are further configured to support the following multi-FIFO operating modes: multiplexer and demultiplexer.

11. The integrated circuit chip of claim 8, wherein said plurality of first-in first-out (FIFO) memory devices are further configured to support the following multi-FIFO operating modes: multiplexer and demultiplexer.

12. The integrated circuit chip of claim 8, wherein the multi-queue mode of operation supports independent write path and read path queue switching.

13. An integrated circuit chip, comprising:
a plurality of first-in first-out (FIFO) memory devices that are collectively configured to support a multi-queue operating mode that supports write queue pointer changes that are free of corresponding write operations and further supports write path queue switching on every write cycle in both SDR and DDR write modes and read path queue switching on every read cycle in both SDR and DDR read modes.

14. An integrated circuit chip, comprising:
a plurality of first-in first-out (FIFO) memory devices that are collectively configured to support a multiplexer operating mode that provides read path queue switching, which is free of read word fall-through, on every read cycle in both SDR and DDR read modes.

15. An integrated circuit chip, comprising:
a plurality of first-in first-out (FIFO) memory devices that are collectively configured to support a demultiplexer operating mode that provides write path queue switching, which is free of write word fall-through, on every write cycle in both SDR and DDR write modes.

16. An integrated circuit chip, comprising:
a plurality of first-in first-out (FIFO) memory devices that are individually configured to have at least double-buffered read data paths and collectively configured to support a multi-queue operating mode that provides write path queue switching on every write cycle and read path queue switching on every read cycle.

* * * * *